US012373080B2

(12) United States Patent
Murata et al.

(10) Patent No.: US 12,373,080 B2
(45) Date of Patent: Jul. 29, 2025

(54) INFORMATION PROCESSING APPARATUS, INFORMATION PROCESSING METHOD, AND RECORDING MEDIUM

(71) Applicant: SONY GROUP CORPORATION, Tokyo (JP)

(72) Inventors: Ryosuke Murata, Kanagawa (JP); Hirotake Ichikawa, Kanagawa (JP); Mitsuru Nishibe, Chiba (JP); Hajime Wakabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 394 days.

(21) Appl. No.: 17/442,005

(22) PCT Filed: Jan. 28, 2020

(86) PCT No.: PCT/JP2020/002889
§ 371 (c)(1),
(2) Date: Sep. 22, 2021

(87) PCT Pub. No.: WO2020/202747
PCT Pub. Date: Oct. 8, 2020

(65) Prior Publication Data
US 2022/0253196 A1   Aug. 11, 2022

(30) Foreign Application Priority Data
Mar. 29, 2019   (JP) .................. 2019-067255

(51) Int. Cl.
*G06F 3/04815*   (2022.01)
*G06F 3/04817*   (2022.01)
(Continued)

(52) U.S. Cl.
CPC ...... *G06F 3/04815* (2013.01); *G06F 3/04817* (2013.01); *G06T 19/20* (2013.01);
(Continued)

(58) Field of Classification Search
None
See application file for complete search history.

(56) References Cited

U.S. PATENT DOCUMENTS

2008/0094421 A1\* 4/2008 Maeda .................... G06F 9/451
345/661
2012/0250940 A1\* 10/2012 Kasahara .............. G06T 19/006
382/103
(Continued)

FOREIGN PATENT DOCUMENTS

CN         107408003 A     11/2017
JP         2017-522682 A    8/2017
(Continued)

*Primary Examiner* — Linda Huynh
(74) *Attorney, Agent, or Firm* — Paratus Law Group, PLLC

(57) ABSTRACT

An information processing apparatus that includes a control unit that acquires first environmental information that expresses a three-dimensional space in the real world, that arranges, based on the first environmental information, a first virtual object represented by a first application into the three-dimensional space, that updates, based on the arrangement of the first virtual object, the first environmental information to second environmental information that includes information that indicates the arrangement of the first virtual object, and that arranges, during execution of the first application, based on the second environmental information, a second virtual object represented by a second application into the three-dimensional space in which the first virtual object is arranged.

22 Claims, 13 Drawing Sheets

(51) Int. Cl.
  *G06T 19/20* (2011.01)
  *G06F 3/01* (2006.01)
(52) U.S. Cl.
  CPC ...... *G06F 3/011* (2013.01); *G06T 2219/2004* (2013.01); *G06T 2219/2016* (2013.01)

(56) References Cited

U.S. PATENT DOCUMENTS

| | | |
|---|---|---|
| 2013/0328927 A1 | 12/2013 | Mount |
| 2016/0350978 A1 | 12/2016 | Mount |
| 2017/0358140 A1 | 12/2017 | Kohler |
| 2018/0308287 A1* | 10/2018 | Daniels ............... G06F 3/04845 |
| 2018/0314889 A1* | 11/2018 | Fukazawa ............... G06F 3/038 |
| 2018/0356956 A1 | 12/2018 | MacGillivray |
| 2019/0180483 A1* | 6/2019 | DeLuca ............... G02B 27/017 |
| 2019/0279407 A1* | 9/2019 | McHugh ................ G06F 3/011 |

FOREIGN PATENT DOCUMENTS

| | | | |
|---|---|---|---|
| JP | 2020-042802 A | 3/2020 | |
| WO | WO 2015/025442 A1 | 2/2015 | |
| WO | WO-2017104198 A1 * | 6/2017 | ............. G06F 3/013 |
| WO | WO 2018/092384 A1 | 5/2018 | |

\* cited by examiner

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2020/002889 (filed on Jan. 28, 2020) under 35 U.S.C. § 371, which claims priority to Japanese Patent Application No. 2019-067255 (filed on Mar. 29, 2019), which are all hereby incorporated by reference in their entirety.

FIELD

The present disclosure relates to an information processing apparatus, an information processing method, and a recording medium.

BACKGROUND

In recent years, a technology called augmented reality (AR) (hereinafter, also referred to as an "AR technology") for presenting additional information that is superimposed onto a real space to a user have been drawing attention. The use of the AR technology allows virtual content (hereinafter, also referred to as a "virtual object") in various forms, such as text, icons, or animations, to be superimposed on an object in a real space (hereinafter, also referred to as a "real object") and presents the obtained object to the user.

Furthermore, in recent years, with the development of the AR technology, an application (hereinafter, also referred to as an "AR app") that presents a virtual object to the user become popular. With the further development of the AR technology in the future, it is conceivable that the AR app is used daily and a plurality of AR apps is simultaneously used. At this time, it is expected that a virtual object of each of the plurality of AR apps be arranged without overlapping each other.

In association with the technology described above, for example, in Patent Literature 1, a technology for appropriately arranging, based on a sensing result obtained in a plurality of real spaces, a virtual object associated with a real object in each of the real spaces into a virtual shared space is described.

CITATION LIST

Patent Literature

Patent Literature 1: International Publication No. WO 2018/092384

SUMMARY

Technical Problem

However, in the technology described above in Patent Literature 1, simultaneous operations of the plurality of AR apps are not taken into account. If the plurality of AR apps are simultaneously operated, a mismatch may occur, such as virtual objects arranged in a real space by different AR apps are displayed in an overlapping manner. In this case, the visibility of the virtual object is reduced, and this may possibly cause a hindrance of the daily use of the AR apps.

Accordingly, in the present disclosure, an information processing apparatus, an information processing method, and a recording medium that are novel, improved, and able to operate a plurality of AR apps in cooperation with each other are proposed.

Solution to Problem

According to the present disclosure, an information processing apparatus is provided that includes: a control unit that acquires first environmental information that expresses a three-dimensional space in the real world, arranges, based on the first environmental information, a first virtual object represented by a first application into the three-dimensional space, updates, based on the arrangement of the first virtual object, the first environmental information to second environmental information that includes information that indicates the arrangement of the first virtual object, and arranges, during execution of the first application, based on the second environmental information, a second virtual object represented by a second application into the three-dimensional space in which the first virtual object is arranged.

Moreover, according to the present disclosure, an information processing method implemented by a processor is provided that executes a process including: acquiring first environmental information that expresses a three-dimensional space in the real world; arranging, based on the first environmental information, a first virtual object represented by a first application into the three-dimensional space; updating, based on the arrangement of the first virtual object, the first environmental information to second environmental information that includes information that indicates the arrangement of the first virtual object; and arranging, during execution of the first application, based on the second environmental information, a second virtual object represented by a second application into the three-dimensional space in which the first virtual object is arranged.

Moreover, according to the present disclosure, a recording medium having stored therein a program is provided that causes a computer to function as: a control unit that acquires first environmental information that expresses a three-dimensional space in the real world; arranges, based on the first environmental information, a first virtual object represented by a first application into the three-dimensional space; updates, based on the arrangement of the first virtual object, the first environmental information to second environmental information that includes information that indicates the arrangement of the first virtual object; and arranges, during execution of the first application, based on the second environmental information, a second virtual object represented by a second application into the three-dimensional space in which the first virtual object is arranged.

DESCRIPTION OF EMBODIMENTS

Figure 1:
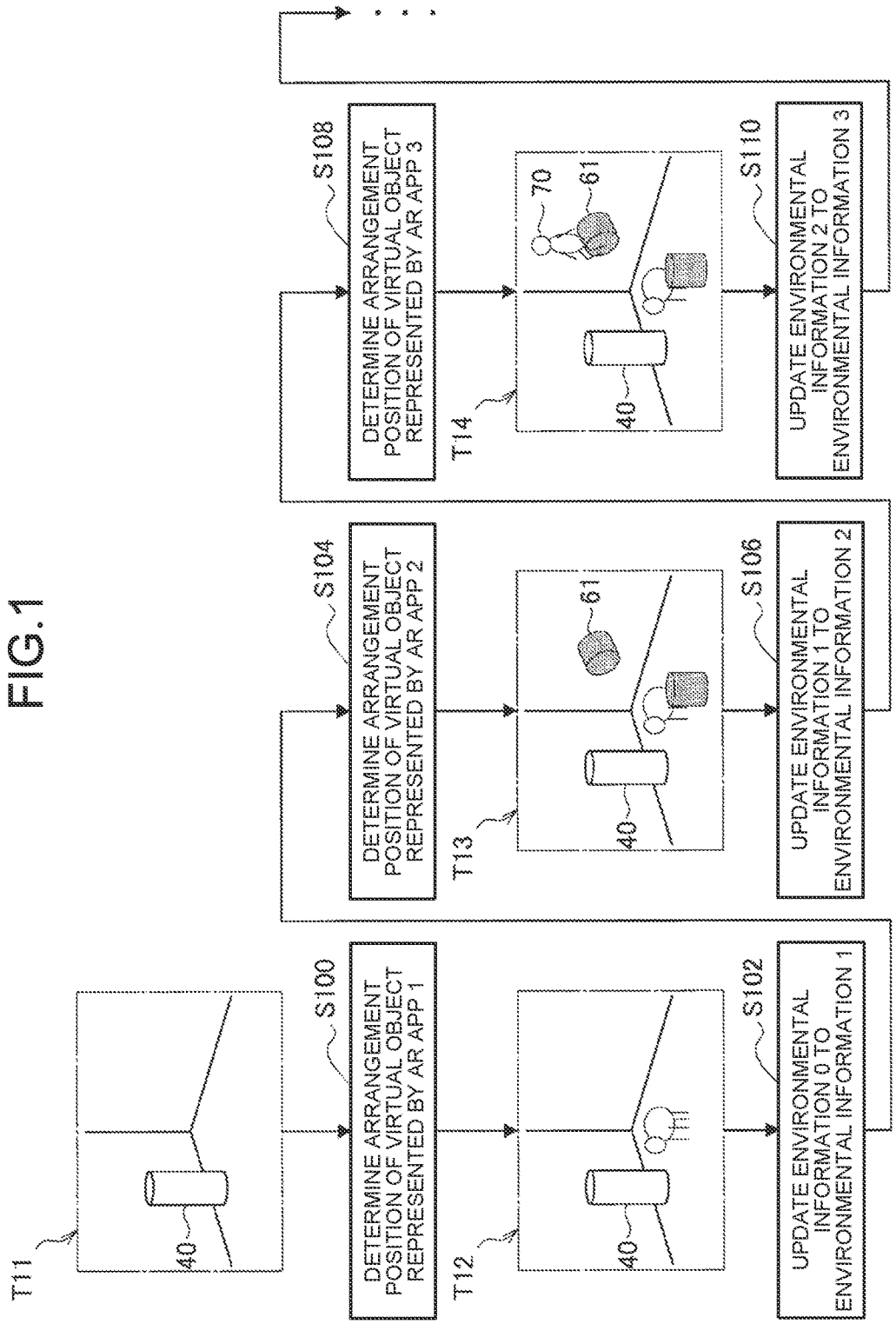
FIG. 1 is a diagram illustrating the outline of an arrangement process of a virtual object according to an embodiment of the present disclosure.

Preferred embodiments of the present disclosure will be explained in detail below with reference to accompanying drawings. Furthermore, in this specification and the drawings, by assigning the same reference numerals to components substantially having the same functional configuration, overlapping descriptions thereof will be omitted.

Furthermore, descriptions will be made in the following order.
1. Outline
2. Configuration example
3. Processing example
4. Specific example
5. Modification
6. Hardware configuration
7. Conclusion 1. Outline The technology according to an embodiment of the present disclosure relates to an information processing apparatus that operates a plurality of AR apps in cooperation with each other. When the plurality of AR apps are simultaneously executed, the information processing apparatus according to the embodiment arranges a virtual object based on information that indicates an environment in a real space (a three-dimensional space) (hereinafter, also referred to as "environmental information") and priority. The environmental information is input to (shared with) each of the AR apps in accordance with priority. Sharing of the environmental information with respect to the AR apps is controlled by the information processing apparatus.

The environmental information includes information that indicates, for example, a shape in a real space. The shape in the real space is, for example, the shape of a real object, such as a person, an animal, a plant, a building, furniture, a road, or a car. The environmental information may also include coordinate information that indicates a position of the real object. Furthermore, the environmental information may include information that indicates the shape of a virtual object arranged in the real space and coordinate information that indicates the position at which the virtual object is arranged. Furthermore, the form of the information that indicates the shape in the real space and the information that indicates the shape of the virtual object arranged (displayed) in the real space may be an arbitrary form, such as in the form of a point cloud (point group) or a 3D mesh (polygon).

Furthermore, the environmental information may also include meta information. The meta information mentioned here is additional information, such as attribute information related to data included in the environmental information. Examples of the attribute information includes a type of file, a size, a creator, or created date and time. If the data included in the environmental information is a real object or a virtual object, the attribute information may also include information that indicates that the data is a real object or the data is a virtual object. Accordingly, it is possible to distinguish the real object from the virtual object.

The AR app refers to the environmental information to be shared and determines an arrangement position of the virtual object. After the arrangement position of the virtual object has been determined, the information (hereinafter, also referred to as "arrangement information") that includes the shape or the arrangement position of the virtual object to be arranged is added to the environmental information, so that the environmental information is updated. The process in which the environmental information is updated is also referred to as an "update process" in a description below. Furthermore, the arrangement information is added to the environmental information, so that the virtual object is arranged in a space indicated by the environmental information. The process in which the virtual object is arranged is also referred to as an "arrangement process" in a description below. Furthermore, in the following, an expression related to the "update process" and an expression related to the "arrangement process" may be used as expressions having a similar meaning.

The environmental information is information that is updated in real time in the update process. With this configuration, each of the AR apps is able to determine an arrangement position of a virtual object based on the real-time environmental information.

After having updated the environmental information including the arrangement information on the virtual objects determined by all of the AR apps that are simultaneously executed, the information processing apparatus displays, based on the updated environmental information, an image obtained by drawing the virtual objects represented by all of the AR apps on a display device or the like. With this configuration, when the plurality of AR apps are simultaneously executed at the same time, the information processing apparatus is able to prevent the plurality of virtual objects from being displayed in an overlapping manner.

(Outline of Process)

In the following, the outline of the arrangement process performed on a virtual object will be described with reference to FIG. 1. FIG. 1 is a diagram illustrating the outline of the arrangement process performed on the virtual object according to the embodiment of the present disclosure.

Hereinafter, the AR app having the highest priority (a first application) is referred to as an "AR app 1". The AR app having the second highest priority (a second application) is referred to as an "AR app 2". The AR app having the third highest priority is referred to as an "AR app 3".

Furthermore, in the following, the environmental information (first environmental information) that is acquired before the virtual object (a first virtual object) represented by the AR app 1 is referred to as "environmental information 0". The environmental information (second environmental information) in which the environmental information 0 is updated so as to include the arrangement information on the virtual object represented by the AR app 1 is referred to as "environmental information 1". The environmental information in which the environmental information 1 is updated so as to include the arrangement information on the virtual object (a second virtual object) represented by the AR app 2 is referred to as "environmental information 2".

When the information processing apparatus according to the embodiment arranges the virtual objects, the information processing apparatus arranges each of the virtual objects based on the arrangement priority of the virtual object represented by the AR app 1 and the virtual object represented by the AR app 2. Because the priority of the virtual object represented by the AR app 1 is higher than the priority of the virtual object represented by the AR app 2, the information processing apparatus arranges the virtual object represented by the AR app 1 by giving the priority over the virtual object represented by the AR app 2.

It is assumed that an environment in the real space before the plurality of AR apps are simultaneously executed is a state T11. In the state T11, a real object 40 is arranged in the real space. In the state T11, if the plurality of AR apps are simultaneously executed, the information processing apparatus acquires the environmental information 0 that indicates a three-dimensional space of the real space in the state T11. The acquired environmental information 0 is shared with the AR app 1.

The AR app 1 refers to the shared environmental information 0 and determines an arrangement position of the virtual object represented by the AR app 1 (S100). For example, as indicated by the state T12 illustrated in FIG. 1, the AR app 1 determines to arrange a virtual object 50 represented by the AR app 1. After the arrangement position has been determined by the AR app 1, the information processing apparatus adds the arrangement information on the virtual object represented by the AR app 1 to the environmental information 0, and then, updates the environmental information 0 to the environmental information 1 that indicates the environment in the real space in the state T12 (S102).

Then, the environmental information 1 is shared with the AR app 2. The AR app 2 refers to the shared environmental information 1 and determines the arrangement position of the virtual object represented by the AR app 2 (S104). For example, as indicated by a state T13 illustrated in FIG. 1, the AR app 2 determines to arrange a virtual object 60 and a virtual object 61 represented by the AR app 2. After the arrangement positions have been determined by the AR app 2, the information processing apparatus adds the arrangement information en the virtual object represented by the AR app 2 to the environmental information 1, thereby updating the environmental information 1 to the environmental information 2 that indicates the environment in the real space in the state T13 (S106).

Furthermore, the number of AR apps that are simultaneously executed is not particularly limited and an arbitrary number of AR apps may be executed. The information processing apparatus repeats the same process as that process that is performed when the AR app 2 is executed and that is in accordance with the number of AR apps that are simultaneously executed.

Specifically, it is assumed that, in addition to the AR app 1 and the AR app 2, the AR app 3 is also simultaneously executed. At this time, the environmental information 2 is shared with the AR app 3.

The AR app 3 refers to the shared environmental information 2 and determines the arrangement position of the virtual object represented by the AR app 3 (S108). For example, as indicated by a state T14 illustrated in FIG. 1, the AR app 3 determines to arrange a virtual object 70 represented by the AR app 3. After the arrangement position has been determined by the AR app 3, the information processing apparatus adds the arrangement information on the virtual object represented by the AR app 3 to the environmental information 2, and then, updates the environmental information 2 to environmental information 3 that indicates the environment in the real space in the state T14 (S110). Here, it may be assumed that there is no change in the data format of the environmental information 3 that has not been updated and the data format of the environmental information 3 that has been updated.

Furthermore, the number of pieces of arrangement information on the virtual objects that are added to the environmental information is not particularly limited and an arbitrary number of pieces of arrangement information on virtual objects may be added.

(Organize Issues)

Figure 2:
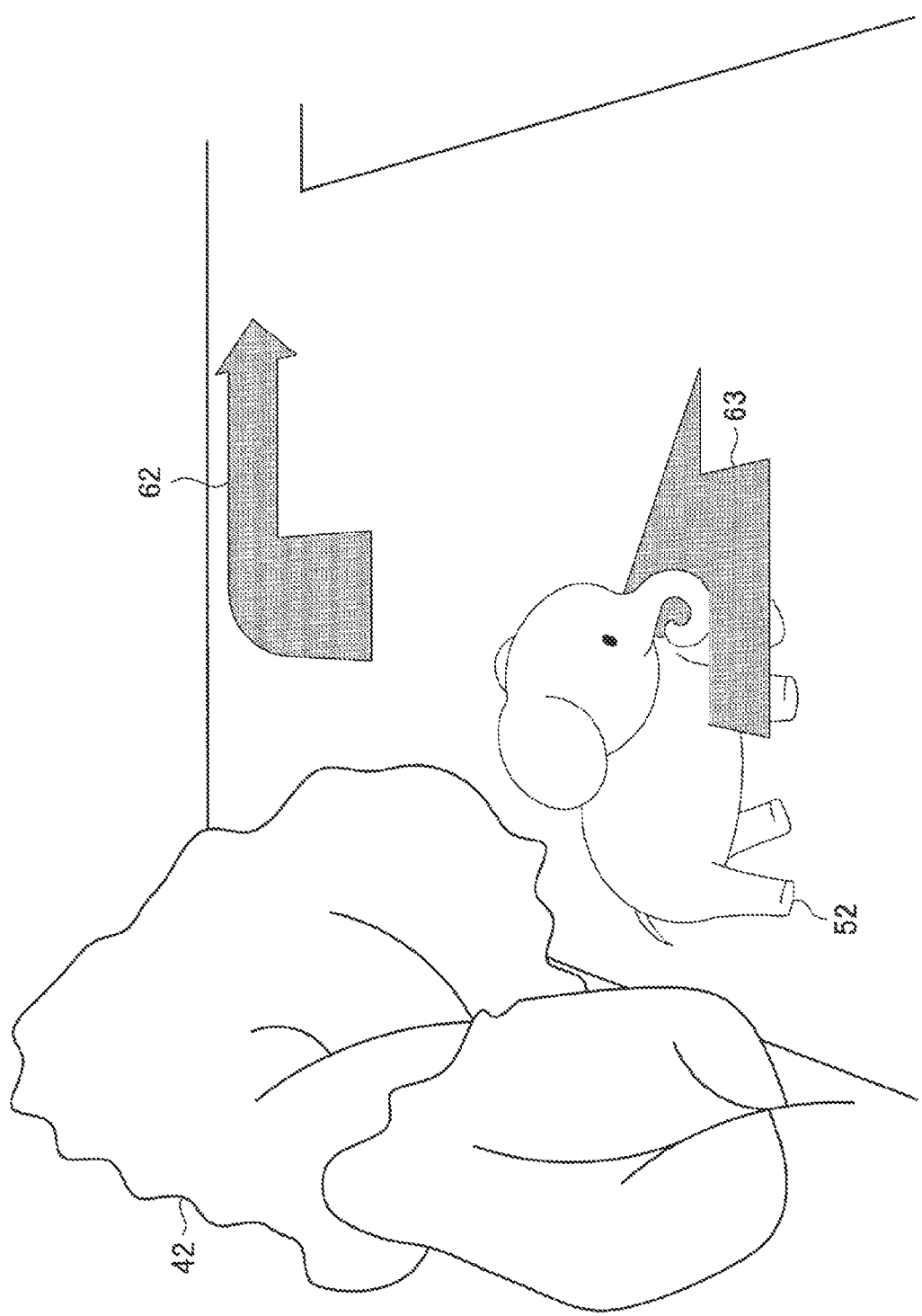
FIG. 2 is a diagram illustrating a display example of a virtual object according to a display terminal.

In the following, a description will be given of organizing issues with reference to FIG. 2. FIG. 2 is a diagram illustrating a display example of a virtual object in a general-purpose display terminal. FIG. 2 illustrates the display of the virtual object at the time at which the AR app 1 that is a game app and the AR app 2 that is a guide app are simultaneously executed. Specifically, FIG. 2 illustrates a state in which a character 52 that is a virtual object represented by the game app and an arrow 62 and an arrow 63 that are virtual objects represented by the guide app are displayed.

In a display process performed on a virtual object in a general-purpose display terminal, an update of information that indicates a state in a virtual space using an AR app in real time is not taken into account. This is because a program is designed without taking into account that each of the AR apps cooperates with each other. Therefore, the rule of the display process including the arrangement process performed on the virtual objects between different AR apps is basically and completely different.

As described above, if the AR apps do not cooperate with each other, for example, the game app is able to change the arrangement of the virtual object related to the game app but is not able to change the arrangement of the virtual object related to the guide app. In contrast, the guide app is able to change the arrangement of the virtual object related to the guide app but is not able to change the arrangement of the virtual object related to the game app. Therefore, if an arrangement position that indicates the virtual object represented by the guide app and that is set in advance (hereinafter, also referred to as an "initial arrangement position") overlaps the position of an already arranged virtual object represented by the game app, a general-purpose display terminal displays the virtual object represented by the guide app and the virtual object represented by the game app in an overlapping manner.

For example, it is assumed that the initial arrangement position of the arrow 62 represented by the guide app is the position of the arrow 62 illustrated in FIG. 2. The position of the arrow 63 illustrated in FIG. 2 is the position in which the arrow 63 overlaps the character 52. However, because the guide app is not able to refer to the information that indicates the state in the virtual space and that has been updated in real time, the guide app is not able to recognize the state in which the arrow 63 overlaps the character 52.

Consequently, the guide app determines to arrange the arrow 63 at the position of the arrow 63 illustrated in FIG. 2 without processing anything. For this reason, a general-purpose display terminal displays individual virtual objects represented by the plurality of AR apps in an overlapping manner. Thus, the visibility of the virtual objects may possibly be reduced.

The embodiment according to the present disclosure has been conceived by focusing on the point described above and a technology capable of operating a plurality of AR apps in cooperation with each other is proposed. In the following, the embodiment will be sequentially described in detail.

2. Configuration Example

Figure 3:
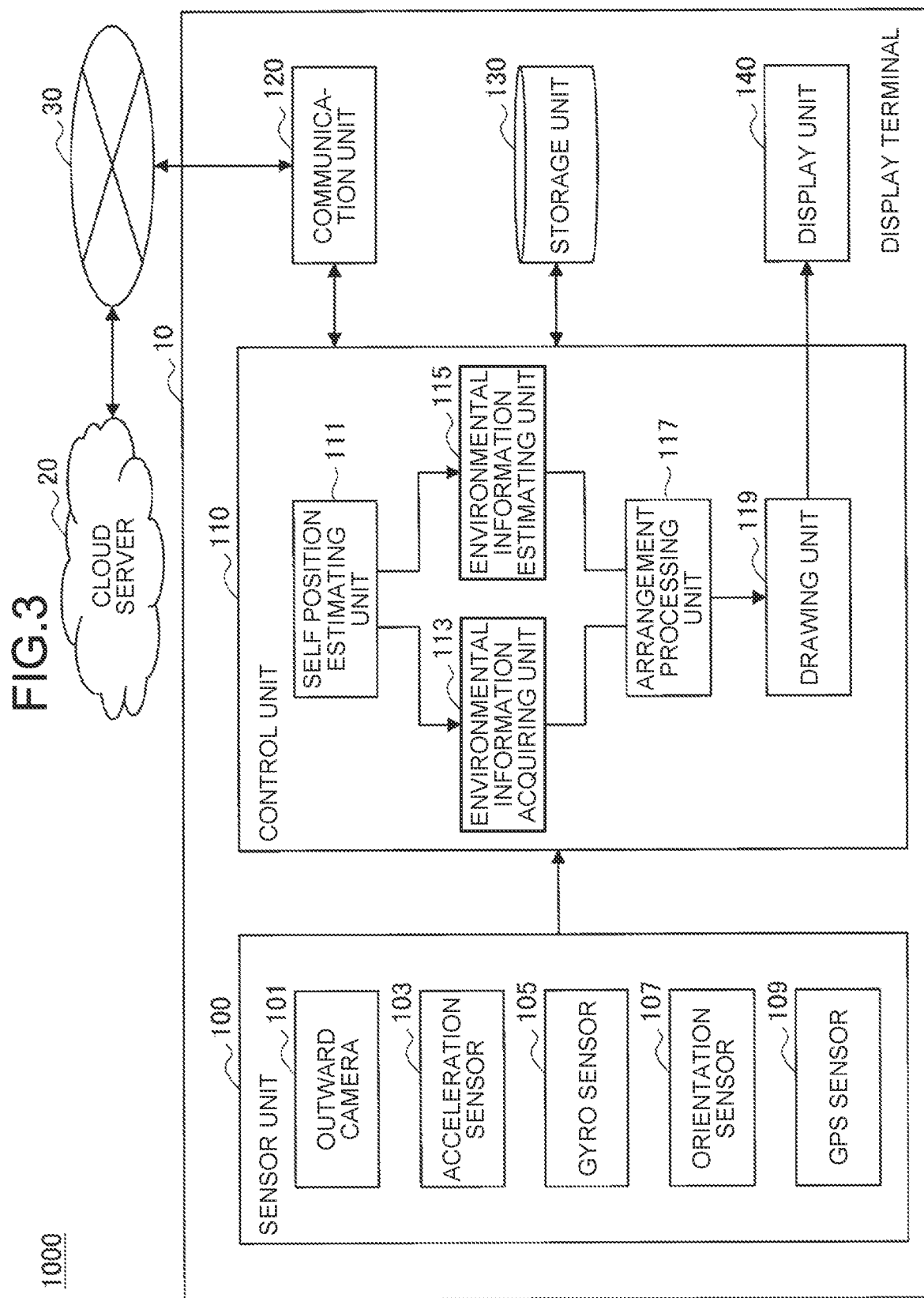
FIG. 3 is a block diagram illustrating a configuration example of an information processing system according to the embodiment of the present disclosure.

First, a configuration example of an information processing system according to the embodiment of the present disclosure will be described. FIG. 3 is a block diagram illustrating a configuration example of an information processing system 1000 according to the embodiment of the present disclosure.
<2-1. System Configuration>

As illustrated in FIG. 3, the information processing system 1000 according to the embodiment includes a display terminal 10, a cloud server 20, and a network 30.
(1) Display Terminal 10

The display terminal 10 is a terminal that displays a virtual object. The display terminal 10 according to the embodiment is implemented by, for example, a terminal of a head mounted display type (HMD) or the like. Example of the HMD used for the display terminal 10 include a see-through type HMD, a video see-through type HMD, and a retinal projection type HMD.

The see-through type HMD holds, by using, for example, a half mirror or a transparent light guide plate, a virtual image optical system constituted by the transparent light guide plate in front of the eyes of the user and displays an image in an inner side of the virtual image optical system. Accordingly, the user wears the see-through type HMD is able to view an external landscape in the field of view while looking and listening an image that is displayed in the inner side of the virtual image optical system. With this configuration, for example, based on the AR technology, the see-through type HMD is able to superimpose an image of a virtual object on an optical image of a real object, which is positioned in a real space, in accordance with at least one of recognition results of a position and a posture of the see-through type HMD. Furthermore, specific examples of the see-through type HMD include what is called an eyeglasses type wearable device in which parts corresponding to the lenses of the eye glasses are structured as the virtual image optical system.

The video see-through type HMD is worn so as to cover the eyes of the user when the video see-through type HMD is worn on the head or the face of the user, and a display unit, such as a display, is held in front of the eyes of the user. Furthermore, the video see-through type HMD includes an imaging unit for capturing images of a surrounding landscape and displays an image of the landscape that is captured by the imaging unit that is located in front of the user on the display unit. With this configuration, the user who wears the video see-through type HMD is able to check the external landscape by using the image displayed on the display unit although the user has difficulty directly viewing the external landscape in the field of view of the user. Furthermore, at this time, the video see-through type HMD may also superimpose based on, for example, the AR technology, a virtual object on the image of the external landscape in accordance with at least one of the recognition results of a position and a posture of the video see-through type HMD.

In the retinal projection type HMD, a projection unit is held in front of the eyes of the user an image is projected so as to be superimposed on the external landscape from the projection unit toward the eyes of the user. More specifically, in the retinal projection type HMD, the image is directly projected on the retina of the eye of the user from the projection unit and the image is formed on the retina. With this configuration, a user with near-sightedness or long-sightedness is also able to look and listen a sharper image. Furthermore, the user who wears the retinal projection type HMD is able to view the external landscape in the field of view even in a period of time for which the user is looking and listening the image projected from the projection unit. With this configuration, the retinal projection type HMD is able to superimpose, based on, for example, the AR technology, the image of the virtual object on the optical image of the real object, which is located in a real space, in accordance with at least one of the recognition results of a position and a posture of the retinal projection type HMD.

Furthermore, in addition to the examples described above, an example of the HMD includes an immersive type HMD. Similarly to the video see-through type HMD, the immersive type HMD is worn so as to cover the eyes of the user and holds a display unit, such as a display, in front of the eyes of the user. Accordingly, the user who wears the immersive type HMD has difficulty directly viewing an external landscape (i.e., a real world landscape) in the field of view, and thus, only the image displayed on the display unit enters the field of view. With this configuration, the immersive type HMD is able to provide an immersive feeling to the user who is looking and listening the image. Accordingly, the immersive type HMD may be applied to a case of presenting information based on mainly, for example, the virtual reality (VR) technology.

Furthermore, the display terminal 10 is not limited to the HMD described above. For example, the display terminal 10 may also be a terminal device, such as a smartphone, a tablet terminal, a wearable terminal, an agent device that includes a display unit.

The display terminal 10 is connected to the cloud server 20 via the network 30 and is able to send and receive information to and from the cloud server 20.

In the display terminal 10, a display process is performed by the information processing apparatus according to the embodiment. For example, the information processing apparatus is mounted on the display terminal 10 and performs the display process that displays a virtual object on the display unit included in the display terminal 10. In the following, a description will be given of an example in which the information processing apparatus is mounted on the display terminal 10; however, the place of the information processing apparatus to be mounted is not limited to the display terminal 10 and an arbitrary device may be used. For example, the information processing apparatus may also be mounted on the cloud server 20 and control the display process performed in the display terminal 10 via the network 30.
(2) Cloud Server 20

The cloud server 20 is a server device that has a function for storing information related to the display process performed in the display terminal 10. For example, the cloud server 20 is an environmental information server that stores therein the environmental information.

The cloud server 20 is connected to the display terminal 10 via the network 30 and is able to send and receive information to and from the display terminal 10. The cloud server 20 may update the already stored environmental information to the environmental information that is received from the display terminal 10.

(3) Network 30

The network 30 has a function for connecting the display terminal 10 and the cloud server 20. The network 30 may also include a public line network, such as the Internet, a telephone line network, or a satellite communication network, or various local area networks (LANs) and wide area networks (WANs) including Ethernet (registered trademark). Furthermore, the network 30 may also include a dedicated line network, such as an Internet Protocol-Virtual Private Network (IP-VPN). Furthermore, the network 30 may also include a wireless communication network, such as Wi-Fi (registered trademark) or Bluetooth (registered trademark).

<2-2. Functional Configuration>

In the following, a functional configuration of the display terminal 10 according to the embodiment of the present disclosure will be described. As illustrated in FIG. 3, the display terminal 10 according to the embodiment includes a sensor unit 100, a control unit 110, a communication unit 120, a storage unit 130, and a display unit 140.

(1) Sensor Unit 100

The sensor unit 100 has a function for sensing information that is used for the process performed in the control unit 110. After the sensing, the sensor unit 100 outputs, to the control unit 110, the sensing information acquired by sensing performed by various sensors.

The sensor unit 100 may include various kinds of sensor devices. As an example, the sensor unit 100 may include, as illustrated in FIG. 3, an outward camera 101, an acceleration sensor 103, a gyro sensor 105, an orientation sensor 107, and a global positioning system (GPS) sensor 109. The sensor unit 100 performs sensing by using the sensors described above. Furthermore, the sensor devices included in the sensor unit 100 are not limited to the example described above and another arbitrary sensor device may also be included.

The outward camera 101 is an imaging device, such as an RGB camera, that includes a lens system, a driving system, and an image sensor and that captures an image (a still image or a moving image). This type of the imaging device is included in the display terminal 10 so as to be capable of capturing images of a surrounding area of the display terminal 10 and is accordingly referred to as an outward camera. With this configuration, the sensor unit 100 is able to acquire a captured image of the surrounding area of the display terminal 10. Furthermore, if the user wears or carries the display terminal 10, the captured image around the display terminal 10 acquired by the sensor unit 100 is also namely a captured image of the surrounding area of the user.

Furthermore, the outward camera 101 may be an imaging device that is able to perform sensing on three-dimensional information included in the real space in which the display terminal 10 is located. An example of the imaging device includes a depth camera. The depth camera may acquire substantially the entire three-dimensional information on the real space by detecting distance information on a distance to the object that is located in front of the depth camera.

The acceleration sensor 103 is a device that acquires acceleration. For example, the acceleration sensor 103 measures acceleration that is an amount of change in speed at the time at which a target moves. The gyro sensor 105 is a device that acquires an angular velocity. For example, the gyro sensor 105 measures an angular velocity that is an amount of change in posture of the target. The information acquired by the acceleration sensor 103 and the gyro sensor 105 is also referred to as "inertia information". With this configuration, the sensor unit 100 is able to acquire the inertia information on the display terminal 10. Furthermore, if the user wears or carries the display terminal 10, the inertia information acquired by the sensor unit 100 is also namely inertia information on the user.

The orientation sensor 107 is a device that acquires information related to orientation. For example, the orientation sensor 107 measures the magnitude or orientation of a magnetic field at a position of the target. Hereinafter, the information acquired by the orientation sensor 107 is also referred to as "orientation information". With this configuration, the sensor unit 100 is able to acquire the orientation information on the display terminal 10. Furthermore, if the user wears or carries the display terminal 10, the orientation information acquired by the sensor unit 100 is also namely the orientation information on the user.

The GPS sensor 109 is a device that acquires position information. For example, the GPS sensor 109 acquires information that indicates latitude, longitude, and altitude of the target obtained by receiving a GPS signal from a GPS satellite. Hereinafter, the information acquired by the GPS sensor 109 is also referred to as "position information". With this configuration, the sensor unit 100 is able to acquire the position information on the display terminal 10. Furthermore, if the user wears or carries the display terminal 10, the position information acquired by the sensor unit 100 is also namely the position information on the user.

(2) Control Unit 110

The control unit 110 is an information processing apparatus that has a function for controlling the entire operation of the display terminal 10. In order to implement the function, the control unit 110 includes, as illustrated in FIG. 3, a self-position estimating unit 111, an environmental information acquiring unit 113, an environmental information estimating unit 115, an arrangement processing unit 117, and a drawing unit 119.

(2-1. Self-Position Estimating Unit 111)

The self-position estimating unit 111 has a function for estimating a self-position of the display terminal 10. For example, the self-position estimating unit 111 estimates the self-position of the display terminal 10 based on the sensing information that is input from the sensor unit. After the estimation, the self-position estimating unit 111 outputs the self-position information that indicates the estimated self-position of the display terminal 10 to the environmental information acquiring unit 113 and the environmental information estimating unit 115.

Estimating the self-position of the display terminal 10 obtained by the self-position estimating unit 111 is performed by using various techniques. For example, the self-position estimating unit 111 may also estimate the self-position of the display terminal 10 based on the captured image acquired by the outward camera 101 included in the sensor unit 100. As an example, the self-position estimating unit 111 simultaneously performs estimation of the self-position and generation of a map of the surrounding area of the self-position obtained from the captured image using simultaneous localization and mapping (SLAM).

Furthermore, the self-position estimating unit 111 may also estimate the self-position of the display terminal 10 based on the inertia information acquired by the acceleration sensor 103 and the gyro sensor 105 included in the sensor unit 100. As an example, the self-position estimating unit 111 estimates the self-position of the display terminal 10 by calculating an amount of a relative movement by adding up the pieces of inertia information using dead reckoning.

Furthermore, the self-position estimating unit 111 may also estimate a self-position of the display terminal 10 based on the inertia information and the orientation information that is acquired by the orientation sensor 107 in the sensor unit 100. As an example, the self-position estimating unit 111 estimates the self-position of the display terminal 10 by acquiring a moving direction of the display terminal 10 from the orientation information and calculating, from the inertia information, an amount of the movement to the moving direction.

Furthermore, the self-position estimating unit 111 may also estimate the self-position of the display terminal 10 based on the position information acquired by the GPS sensor 109 included in the sensor unit 100. As an example, the self-position estimating unit 111 estimates, as the self-position of the display terminal 10, the position indicated by the latitude, the longitude, and the altitude included in the position information.

Furthermore, the self-position estimating unit 111 may also estimate the self-position of the display terminal 10 in combination with the plurality of techniques described above. By using the plurality of techniques in combination, the self-position estimating unit 111 is able to improve the accuracy of estimating the self-position of the display terminal 10.

(2-2. Environmental Information Acquiring Unit 113)

The environmental information acquiring unit 113 has a function for acquiring the environmental information. For example, the environmental information acquiring unit 113 acquires the environmental information stored in the cloud server 20 via the communication unit 120 and the network 30. At this time, the environmental information acquiring unit 113 receives the environmental information on a surrounding area of the self-position of the display terminal 10 from the cloud server 20 by sending the self-position of the display terminal 10, which is input from the self-position estimating unit 111, to the cloud server 20. After the reception of the environmental information, the environmental information acquiring unit 113 outputs the received environmental information to the arrangement processing unit 117.

(2-3. Environmental Information Estimating Unit 115)

The environmental information estimating unit 115 has a function for estimating the environmental information. For example, the environmental information estimating unit 115 estimates the environmental information on a surrounding area of the display terminal 10 based on the sensing information acquired by the sensor unit 100. After the estimation of the environmental information, the environmental information estimating unit 115 outputs the estimated environmental information to the arrangement processing unit 117.

For example, the environmental information estimating unit 115 performs an image recognition process on the captured image acquired by the outward camera 101 in the sensor unit 100 and estimates the environmental information on the surrounding area of the display terminal 10 based on the recognition result. Furthermore, the environmental information estimating unit 115 may also estimate the environmental information on the surrounding area of the display terminal 10 based on the three-dimensional information acquired by the outward camera 101. With this configuration, the information processing apparatus is able to continue the display process for a virtual object based on the estimated environmental information even in a state in which the environmental information is not able to be acquired from the cloud server 20 due to, for example, an unstable connection of the network.

Furthermore, the environmental information estimating unit 115 may also estimate the environmental information by using the captured image and the three-dimensional image in combination that are captured by the outward camera 101. By estimating the environmental information by using the captured image and the three-dimensional image in combination, the environmental information estimating unit 115 is able to improve the accuracy of estimating the environmental information.

Furthermore, the environmental information estimating unit 115 is able to estimate the environmental information in real time by estimating the environmental information at the timing at which the sensing information is acquired.

(2-4. Arrangement Processing Unit 117)

The arrangement processing unit 117 has a function for performing an arrangement process (an update process) on virtual objects. For example, the arrangement processing unit 117 arranges the virtual objects based on priority. Specifically, first, the arrangement processing unit 117 determines the order of the arrangements of the virtual objects based on priority. After the determination of the order, the arrangement processing unit 117 shares the pieces of environmental information with the AR app in the order of the determined arrangements and allows the AR app to determine the arrangement positions of the virtual objects. After the determination of the arrangement positions determined by the AR app, the arrangement processing unit 117 receives the arrangement information from the AR app and adds the received arrangement information to the environmental information, thereby updating the environmental information. Furthermore, the arrangement processing unit 117 may also perform a process related to setting of the priority. In the following, a process performed by the arrangement processing unit 117 will be sequentially described in detail.

(2-4-1. Type of Priority)

The priority according to the embodiment may include two types of priority, i.e., AR app priority (first priority) and virtual object priority (second priority). The AR app priority is priority that is set to the AR apps. The virtual object priority is priority that is set to the virtual objects without distinguishing the AR apps. The arrangement processing unit 117 arranges the virtual objects based on at least one of the AR app priority and the virtual object priority.

When arranging the virtual objects based on the AR app priority, the arrangement processing unit 117 compares the AR app priority for each AR app and arranges, with priority, the virtual object that is represented by the AR app and in which the AR app priority is high. For example, it is assumed that the AR app 1, the AR app 2, and the AR app 3 are simultaneously executed. At this time, the arrangement processing unit 117 arranges the virtual objects in the order of the virtual object represented by the AR app 1, the virtual object represented by the AR app 2, and the virtual object represented by the AR app 3. Furthermore, if a single AR app has a plurality of virtual objects, it may also be possible to further set priority for each virtual object in the AR app.

When arranging the virtual objects based on the virtual object priority, the arrangement processing unit 117 compares the virtual object priority for each virtual object and arranges, with priority, the virtual object in which the virtual object priority is high. For example, it is assumed that the AR app 1 has a virtual object 1 with the third highest priority and the virtual object 2 with the fifth highest priority.

Furthermore, it is assumed that the AR app 2 has the virtual object 3 with the highest priority and a virtual object 4 with the sixth highest priority. Furthermore, it is assumed that the AR app 3 has a virtual object 5 with the fourth highest priority and a virtual object 6 with the second highest priority. At this time, the arrangement processing unit 117 arranges the virtual objects in the order of the virtual object 3, the virtual object 6, the virtual object 1, the virtual object 5, the virtual object 2, and the virtual object 4.

Furthermore, there is no need to set priority to an item other than the virtual object arranged in the real space performed based on the logic of the AR app, such as a display performed by a notification function of the operating system (OS) installed in the display terminal 10.

(2-4-2. Setting of Priority)

The priority may be set by, for example, a user in advance. At this time, if the same priority has been set, it is difficult for the arrangement processing unit 117 to judge which of the virtual objects is to be arranged by assigning priority. Accordingly, it is preferable to set different priority to the AR app priority of the plurality of AR apps and the virtual object priority of the plurality of virtual objects. If the same priority is set, the arrangement processing unit 117 may also again set the priority.

For example, the arrangement processing unit 117 sets the priority of the virtual objects based on a designation method of designating the coordinates that indicates the arrangement position of the virtual object that is set by the AR app. Specifically, the arrangement processing unit 117 sets the priority of the virtual object in which the designation method of designating the coordinates is the absolute coordinates to the priority that is higher than the priority of the virtual object in which the designation method of designating the coordinates is the relative coordinates. The absolute coordinates are the coordinates that indicates a specific position with respect to the origin in the absolute coordinate system. Accordingly, the absolute coordinates indicates a fixed position. Thus, it is preferable to arrange the virtual object designated by the absolute coordinates at the designated coordinates.

In contrast, the relative coordinates indicates the coordinates at the position away from a predetermined distance from an arbitrary reference point. The relative coordinates is the coordinates that indicates a specific position on the basis of using, for example, the position of the user as the origin in the relative coordinates system. Accordingly, if the user moves, the relative coordinates indicates a variable position. Thus, the virtual object designated by the relative coordinates may be allowed to move from the designated coordinates.

Furthermore, the arrangement processing unit 117 may also set the priority of the virtual object based on the degree of freedom of a movement of the virtual object. The degree of freedom of the movement of the virtual object indicates the number of dimensions of the space in which the virtual object is able to move. For example, if the virtual object is able to move in a one-dimensional space, the degree of freedom of the virtual object is one. The virtual object with a degree of freedom 1 in the absolute coordinates is, for example, a character that is represented by a game app and that freely moves in the one-dimensional space. The virtual object with the degree of freedom 1 in the relative coordinates is a moving image playback screen in which, for example, in the spherical coordinate system in which the head of the user is set to the origin, a radius R and an angle $\theta$ are fixed but an angle $\varphi$ is variable.

Furthermore, if the virtual object is able to move in a two-dimensional space, the degree of freedom of the virtual object is two. The virtual object with a degree of freedom 2 in the absolute coordinates is, for example, a character that is represented by a game app and that freely moves in the two-dimensional space. The virtual object with the degree of freedom 2 in the relative coordinates is a moving image playback screen in which, for example, in the spherical coordinate system in which the head of the user is set to the origin, the radius R is fixed but the angle $\theta$ and the angle $\varphi$ are variable.

Furthermore, if the virtual object is able to move in a three-dimensional space, the degree of freedom of the virtual object is three. The virtual object with a degree of freedom 3 in the absolute coordinates is, for example, a character that is represented by a game app and that freely moves in the three-dimensional space. The virtual object with the degree of freedom 3 in the relative coordinates is an advertisement that is arranged by adjusting, for example, in the spherical coordinate system in which the head of the user is set to the origin, all of the radius R, the angle $\theta$, and the angle $\varphi$ are optimally adjusted.

Furthermore, if the virtual object does not move and stands still, the degree of freedom of the virtual object is zero. The virtual object with a degree of freedom 0 in the absolute coordinates is, for example, a signboard of a shop displayed at a fixed position. The virtual object with the degree of freedom 0 in the relative coordinates is, for example, a menu that has a constant positional relationship with the user and that always follows the hands of the user.

The arrangement processing unit 117 sets the priority or the virtual object in which the degree of freedom of a movement is low to the priority that is higher than the priority of the virtual object in which the degree of freedom of a movement is high. For example, it is assumed that the user sets the priority of the virtual object with the degree of freedom 0 and the priority of the virtual object with the degree of freedom 3 to the same priority. In this case, the arrangement processing unit 117 again sets the priority such that the priority of the virtual object with the degree of freedom 0 is higher than the priority of the virtual object with the degree of freedom 3.

Furthermore, if the priority is not set, the arrangement processing unit 117 may also set the priority based on the designation method of designating the coordinates and the degree of freedom of the movement. Furthermore, if the priority is not set, the arrangement processing unit 117 may also automatically set the priority to the lowest level.

Change in Priority

Furthermore, the priority may also be changed by the arrangement processing unit 117 in accordance with an input to the display terminal 10 performed by the user. For example, the priority may also be changed in accordance with a dynamic operation performed by the user. As an example, if an operation indicating a replacement of the priority of the AR app is performed by the user, the arrangement processing unit 117 replace the priority of the AR app that is designated by the subject operation. For example, it is assumed that the user performs an operation of replacing the AR app that is running in the background with the AR app that is running in the foreground. At this time, the arrangement processing unit 117 replaces the priority of the AR app running in the background with the priority of the AR app running in the foreground.

Furthermore, if the user performs an action of turning the line of sight to the virtual object that is represented by the AR app and that is desired by the user to change its priority and calling the virtual object forward by using a gesture, the arrangement processing unit 117 may also change the priority of the AR app that is called forward to the highest priority. In contrast, if the user performs an action of turning the line of sight to the virtual object that is represented by the AR app and that is desired by the user to change its priority and driving the virtual object away backward by using a gesture, the arrangement processing unit 117 may also change the priority of the AR app that is placed backward to the lowest priority.

Furthermore, if the user input an operation unique to a specific AR app, the arrangement processing unit 117 may also change the priority of the AR app to the highest priority.

(2-4-3. Arrangement of Virtual Object)

Share Between Self-Position and Environmental Information

The arrangement processing unit 117 shares the self-position of the display terminal 10 and the environmental information with the AR apps in descending order of priority that has been set. For example, the arrangement processing unit 117 shares the self-position of the display terminal 10 estimated by the self-position estimating unit 111 with the AR app. With this configuration, the AR app is able to acquire the AR app data that is in accordance with the self-position of the display terminal 10 from the AR app server. The AR app data is data that includes, for example, information, such as the shape of the virtual object or the initial arrangement position. Furthermore, the AR app data may also include sound data related to a voice that is output during execution of the AR app or haptic data related to tactile exhibited by the user.

Furthermore, if, for example, the environmental information is shared with the AR app 1, the arrangement processing unit 117 shares, with the AR app 1, the environmental information that is input from the environmental information acquiring unit 113 or the environmental information estimating unit 115 as the environmental information 0. Furthermore, the arrangement processing unit 117 may also acquire the environmental information from both of the environmental information acquiring unit 113 and the environmental information estimating unit 115 and share, with the AR app 1, the environmental information, in which the acquired two pieces of environmental information are merged, as the environmental information 0. Furthermore, if the environmental information is shared with the AR app that is other than the AR app 1, the arrangement processing unit 117 shares the environmental information that has been subjected to the arrangement process with the AR app that is other than the AR app 1. With this configuration, the AR app is able to check the arrangement position of the virtual object represented by the other AR app without directly communicating with the other AR app. It may be assumed that the data format of the environmental information referred to by the AR app 1 and the data format of the environmental information that is referred to by the application other than the AR app 1 are the same.

Determination of Arrangement Position

The arrangement position of the virtual object is determined by the logic on the AR app side. For example, the AR app refers to the environmental information from the arrangement processing unit 117 and determines the arrangement position of the virtual object. After the determination, the AR app outputs the arrangement information including the arrangement position of the virtual object to the arrangement processing unit 117. The AR app is able to check the arrangement position of the virtual object represented by the other AR app by referring to the environmental information, so that the AR app is able to determine the arrangement position of the virtual object at the position that does not overlap the position of the virtual object of the other AR app.

Arrangement of Virtual Object

The arrangement processing unit 117 arranges, by adding the arrangement information that is input from the AR app to the environmental information, the virtual object in the space that is indicated by the environmental information. For example, when arranging the virtual object represented by the AR app 1, the arrangement processing unit 117 arranges the virtual object represented by the AR app 1 by adding, to the environmental information 0, the arrangement information that is input from the AR app 1. Because the arrangement information on the AR app 1 is added, the environmental information 0 is updated to the environmental information 1.

Furthermore, when arranging the virtual object represented by the AR app 2, the arrangement processing unit 117 arranges the virtual object represented by the AR app 2 in accordance with whether, based on the environmental information 1, the virtual object represented by the AR app 1 is arranged at the initial arrangement position of the virtual object represented by the AR app 2. Furthermore, whether or not the virtual object represented by the other AR app is arranged at the initial arrangement position of the virtual object is determined by the logic on the AR app side. For example, the AR app 2 refers to the environmental information 1 from the arrangement processing unit 117 and determines whether the virtual object represented by the AR app 1 is arranged at the initial arrangement position of the virtual object represented by the AR app 2.

If the virtual object represented by the AR app 1 is arranged at the initial arrangement position of the virtual object represented by the AR app 2, the AR app 2 determines to arrange the virtual object at the position that does not overlap the position that is associated with the virtual object represented by the AR app 1 and that is other than the initial arrangement position. In contrast, if the virtual object represented by the AR app 1 is not arranged at the initial arrangement position of the virtual object represented by the AR app 2, the AR app 2 determines to arrange the virtual object at the initial arrangement position. After the determination of the arrangement position, the AR app 2 outputs the arrangement information to the arrangement processing unit 117.

Then, the arrangement processing unit 117 arranges the virtual object represented by the AR app 2 by adding, to the environmental information 1, the arrangement information that is input from the AR app 2. Because the arrangement information on the AR app 2 is added, the environmental information 1 is updated to the environmental information 2. Namely, although the AR app 2 is not able to directly control the arrangement of the virtual object represented by the AR app 1, the AR app 2 is able to appropriately arrange the virtual object represented by the AR app 2 by recognizing the virtual object represented by the AR app 1 as the environmental information 1. With this configuration, the arrangement processing unit 117 is able to arrange the virtual objects without overlapping the plurality of virtual objects.

(2-5. Drawing Unit 119)

The drawing unit 119 has a function for drawing a virtual object. For example, the drawing unit 119 draws the virtual object based on the environmental information that is input from the arrangement processing unit 117. Specifically, the drawing unit 119 refers to the environmental information and generates an image that is drawn such that the virtual object that is arranged in the environmental information is superimposed on the real space. Then, the drawing unit 119 outputs the generated image to the display unit 140.

(3) Communication Unit 120

The communication unit 120 has a function for communicating with an external device. The communication unit 120 outputs, in communication with, for example, an external device, the information received from the external device to the control unit 110. Specifically, in communication with the cloud server 20 via the network 30, the communication unit 120 receives the environmental information from the cloud server 20 and outputs the received environmental information to the control unit 110.

The communication unit 120 sends, in communication with, for example, an external device, the information that is input from the control unit 110 to the external device. Specifically, the communication unit 120 sends, to the cloud server 20, the self-position information on the display terminal 10 that is input from the environmental information acquiring unit 113 included in the control unit 110 at the time of acquiring the environmental information.

(4) Storage Unit 130

The storage unit 130 has a function for storing therein information related to the process performed in the display terminal 10. For example, the storage unit 130 may store therein the environmental information. As an example, the storage unit 130 may store therein the environmental information that has been acquired by the environmental information acquiring unit 113, the environmental information that has been estimated by the environmental information estimating unit 115, and the environmental information that has been updated by the arrangement processing unit.

Furthermore, the information stored in the storage unit 130 is not limited to the examples described above. For example, the storage unit 130 may also store therein the sensing information obtained by the sensor unit 100. Furthermore, the storage unit 130 may also store therein programs of various applications.

(5) Display Unit 140

The display unit 140 has a function for outputting in accordance with an input from the control unit 110. For example, the display unit 140 displays the image that is input from the control unit 110. As an example, the display unit 140 displays the image that is generated by the drawing unit 119 included in the control unit 110 and in which the virtual object is superimposed into the real space.

3. Process Example

In the above, the configuration example according to the embodiment has been described. In the following, a process example according to the embodiment will be described. In a description below, as an example, a description will be given of an example of a process (drawing process) up to a process of generating an image in which the virtual object represented by each of the AR apps is drawn at the time of simultaneously executing the AR app 1 and the AR app 2.

(1) Main Process

Figure 4:
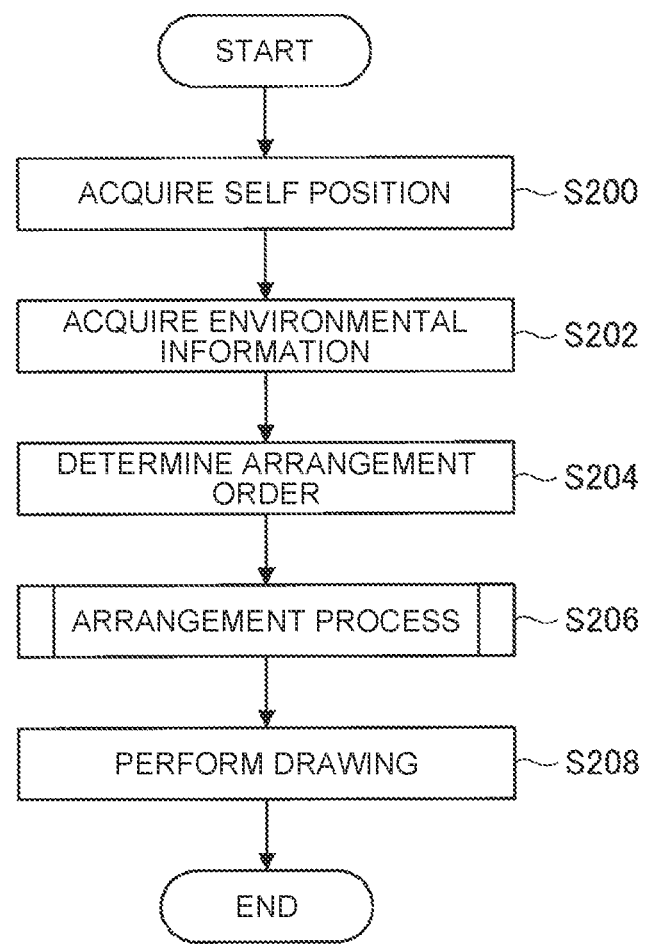
FIG. 4 is a flowchart illustrating the flow of a main process in a drawing process performed on the virtual object according to the embodiment.

First, a main process of the drawing process will be described with reference to FIG. 4. FIG. 4 is a flowchart illustrating the flow of the main process of the drawing process performed on the virtual object according to the embodiment of the present disclosure. In the following, an example in which the environmental information is acquired from the cloud server 20 will be described.

First, the control unit 110 in the display, terminal 10 estimates a self-position based on the sensing information (S200). Then, the control unit 110 acquired the environmental information from the cloud server 20 (S202). Then, the control unit 110 determines an arrangement order of the virtual objects based on the priority of the plurality of AR apps that are actually executed (S204). Then, the control unit 110 performs the arrangement process and arranges the virtual objects (S206). Then, the control unit 110 generates an image in which the virtual objects are drawn at the determined positions (S206).

(2) Arrangement Process

Figure 5:
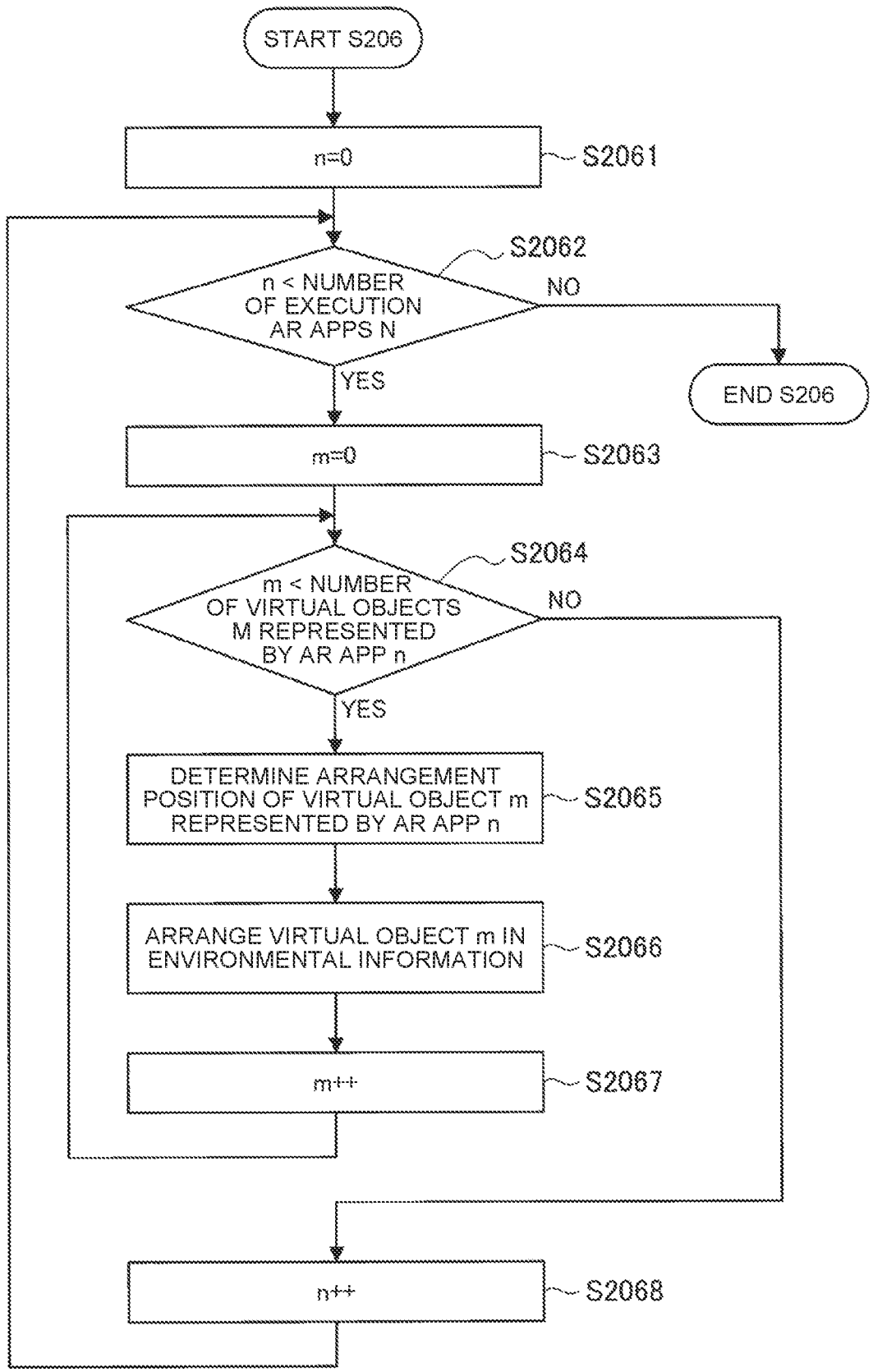
FIG. 5 is a flowchart illustrating the flow of an arrangement process according to the embodiment.

Subsequently, an arrangement process will be described in detail with reference to FIG. 5. FIG. 5 is a flowchart illustrating the flow of the arrangement process according to the embodiment of the present disclosure. In the following, N denotes the number of AR apps that are simultaneously executed. n denotes a numeral attached to the AR app in which the arrangement process is being performed on the virtual object. M denotes the number of virtual objects represented by an AR app n. m denotes a numeral attached to the virtual object in which the arrangement process is being performed.

First, the control unit 110 initializes n with zero (S2061). Then, the control unit 110 checks whether n is smaller than the number of AR apps N that are simultaneously executed (S2062).

If n is smaller than the number of AR apps N (YES at S2062), the control unit 110 initializes m with zero. Subsequently, the control unit 110 checks whether m is smaller than the number of virtual objects P represented by the AR app n (S2064).

If m is smaller than the number of virtual objects M (YES at S2064), the control unit 110 allows the AR app n to determine the arrangement position of the virtual object m represented by the AR app n. Subsequently, the control unit 110 arranges the virtual object m in the environmental information (S2066). After the arrangement, the control unit 110 increments m (S2067). After the increment, the control unit 110 again checks whether m is smaller than the number of virtual objects M represented by the AR app n (S2064).

If m is smaller than the number of virtual objects M (YES at S2064), the control unit 110 repeats the processes from S2064 to S2067 until m is greater than the number of virtual objects M.

If m is greater than the number of virtual objects P (NO at S2064), the control unit 110 increment n (S2068). After the increment, the control unit 110 again checks whether n is smaller than the number of AR apps N that are simultaneously executed (S2062).

If n is smaller than the number of AR apps N (YES at S2062), the control unit 110 repeats the processes from S2062 to S2068 until n is greater than the number of AR apps N.

If n is greater than the number of AR apps N (NO at S2062), the control unit 110 ends the arrangement process.

(3) Data Flow

Figure 6:
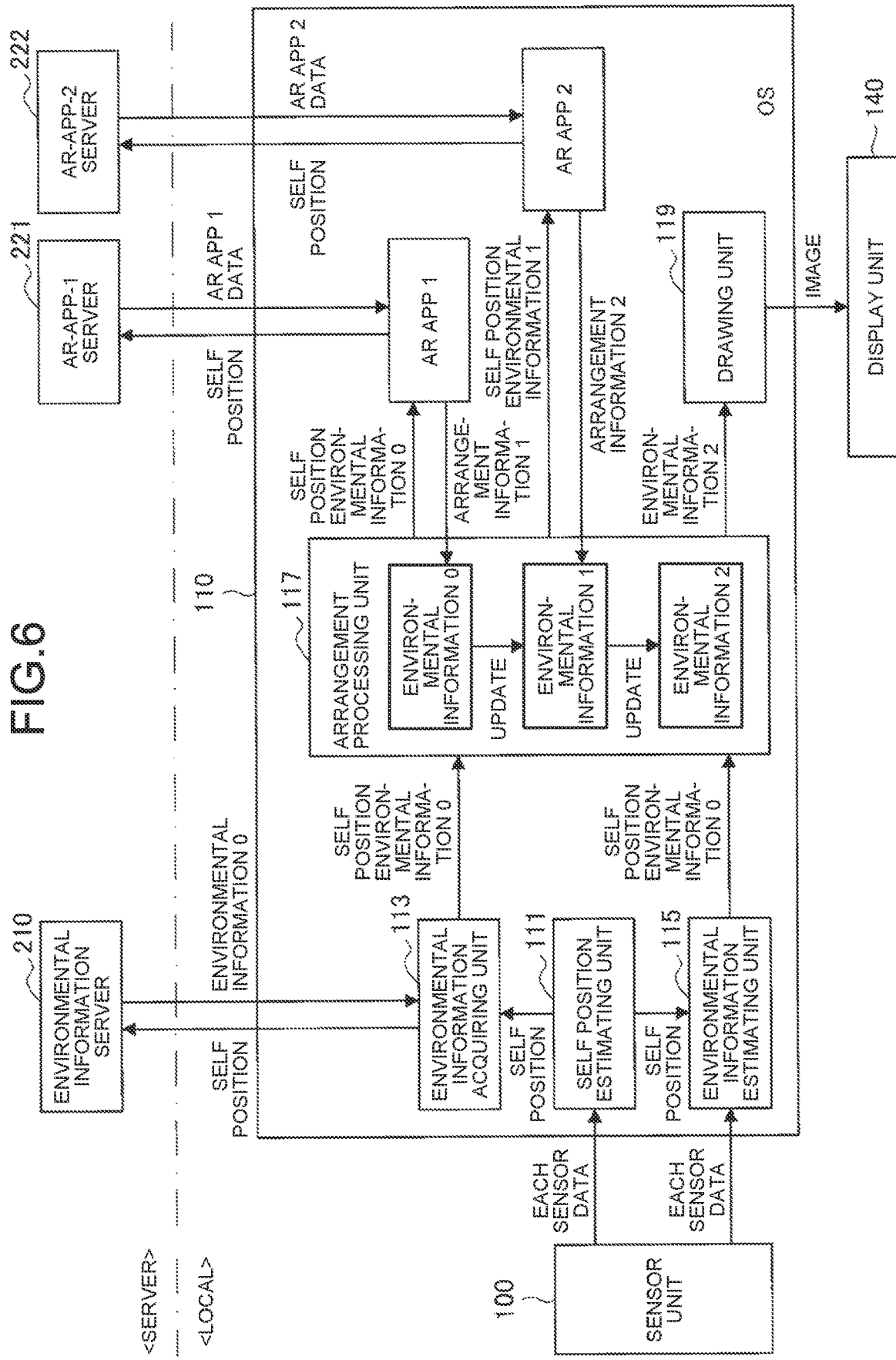
FIG. 6 is a flowchart illustrating the flow of data according to the embodiment.

Subsequently, the flow of data in the drawing process performed on a virtual object will be described with reference to FIG. 6. FIG. 6 is a flowchart illustrating the flow of data according to the embodiment of the present disclosure.

First, the sensor unit 100 outputs the sensing information to the self-position estimating unit 111. When the environmental information estimating unit 115 estimates the environmental information, the sensor unit 100 also outputs the sensing information to the environmental information estimating unit 115.

The self-position estimating unit 111 estimates the self-position of the display terminal 10 based on the sensing information that is input from the sensor unit 100. When the environmental information acquiring unit 113 acquires the environmental information, the self-position estimating unit 111 outputs the estimated self-position to the environmental information acquiring unit 113. When the environmental information estimating unit 115 estimates the environmental information, the self-position estimating unit 111 outputs the estimated self-position to the environmental information estimating unit 115.

The environmental information acquiring unit 113 sends, to an environmental information server 210, the self-position that is input from the self-position estimating unit 111. The environmental information server 210 that has received the self-position sends the environmental information 0 that is in accordance with the self-position to the environmental information acquiring unit 113. The environmental information acquiring unit 113 that has received the environmental information 0 outputs the acquired environmental information 0 and the self-position to the arrangement processing unit 117.

The environmental information estimating unit 115 estimates the environmental information 0 based on the sensing information that is input from the sensor unit 100. After the estimation, the environmental information estimating unit 115 outputs, to the arrangement processing unit 117, the estimated environmental information 0 and the self-position that is input from the self-position estimating unit 111.

The arrangement processing unit 117 outputs, to the AR app 1, the environmental information 0 that is input from the environmental information acquiring unit 113 or the environmental information estimating unit 115 and the self-position. The AR app 1, to which the environmental information 0 and the self-position are input, sends the input self-position to an AR-app-1 server 221. The AR-app-1 server 221 that has received the self-position sends, to the AR app 1, data on the AR app 1 including the shape of the virtual object that is in accordance with the input self-position, the initial arrangement position, or the like. The AR app 1 that has received the data on the AR app 1 determines the arrangement position of the virtual object based on the environmental information 0 and the data on the AR app 1. After the determination, the AR app 1 outputs the arrangement information 1 including the arrangement position to the arrangement processing unit 117.

The arrangement processing unit 117 updates the environmental information 0 to the environmental information 1 by adding, to the environmental information 0, the arrangement information 1 that is input from the AR app 1. After the update, the arrangement processing unit 117 outputs the environmental information 1 and the self-position to the AR app 2. The AR app 2, to which the environmental information 1 and the self-position are input, sends the input self-position to an AR-app-2 server 222. The AR-app-2 server 222 that has received the self-position sends, to the AR app 2, data on the AR app 2 including the shape of the virtual object that is in accordance with the input self-position, the initial arrangement position, or the like. The AR app 2 that has received the data on the AR app 2 determines the arrangement position of the virtual object based on the environmental information 1 and the data on the AR app 2. After the determination, the AR app 2 outputs the arrangement information 2 including the arrangement position to the arrangement processing unit 117.

The arrangement processing unit 117 updates the environmental information 1 to the environmental information 2 by adding the arrangement information 2 that has been input from the AR app 2 to the environmental information 1. After the update, the arrangement processing unit 117 outputs the environmental information 2 to the drawing unit 119.

The drawing unit 119 generates, based on the environmental information 2 that has been input from the arrangement processing unit 117, an image in which the virtual object is drawn. After the generation, the drawing unit 119 outputs the generated image to the display unit 140.

4. Specific Example

In the above, the process example according to the embodiment has been described. In the following, a specific example according to the embodiment will be described. In a description below, as an example, a description will be given of an example in which the game app (the AR app 1) and the guide app (the AR app 2) are simultaneously executed. Furthermore, the type of the AR apps is not limited to the game app and the guide app and an arbitrary type of AR app may be used. For example, the AR app may also be an advertisement app that displays a signboard, a poster, or the like. Furthermore, in a description below, it is assumed that the environmental information 0 acquired by the environmental information acquiring unit 113 is used.

<4-1. Outline of Arrangement Process>

Figure 7:
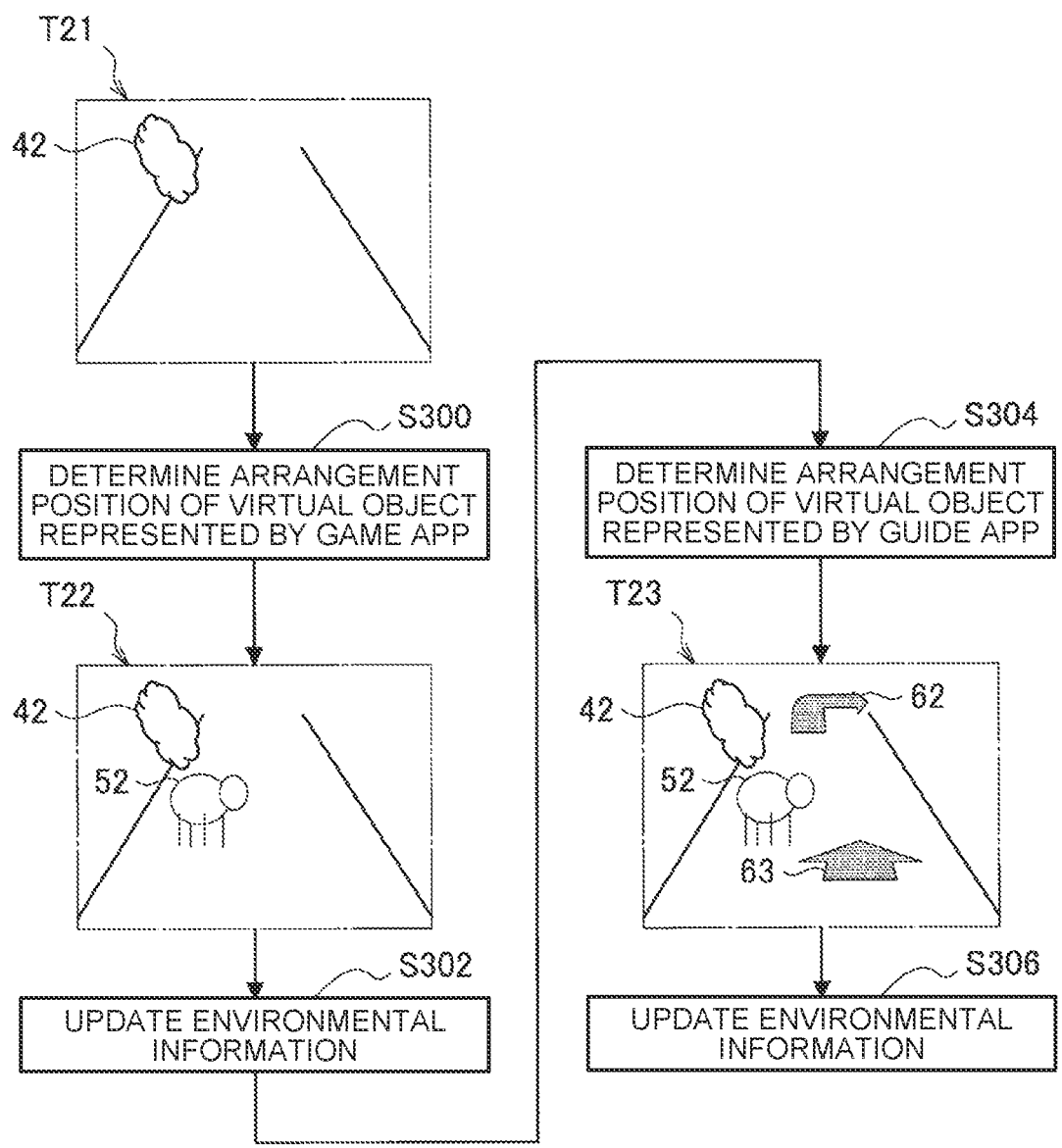
FIG. 7 is a diagram illustrating the outline of the arrangement process performed on a virtual object in a specific example according to the embodiment.

First, the outline of the arrangement process in the specific example according to the embodiment will be described with reference to FIG. 7. FIG. 7 is a diagram illustrating the arrangement process performed on the virtual object in the specific example according to the embodiment of the present disclosure.

It is assumed that the environment in the real space before the game app and the guide app are simultaneously executed is a state 121. In the state 121, a tree 42 is present as a real object in the real space. In the state T21, if the game app and the guide app are simultaneously executed, the environmental information acquiring unit 113 acquires the environmental information 0 that indicates the three-dimensional space in the real space in the state T21. After the acquisition of the environmental information 0, the arrangement processing unit 117 shares the acquired environmental information 0 with the game app.

The game app determines, by referring to the shared environmental information 0, the arrangement position of the character 52 that is a virtual object represented by the game app (S300). For example, the game app determines to arrange the character 52 represented by the game app in a state indicated by the state 122 illustrated in FIG. 7. After the determination of the arrangement position performed by the game app, the arrangement processing unit 117 adds the arrangement information on the character 52 represented by the game app to the environmental information 0, and then, updates the data to the environmental information 1 that indicates the environment in the real space in the state 122 (S302).

Subsequently, the environmental information 1 is shared with the guide app. The guide app refers to the shared environmental information 1 and determines the arrangement positions of the arrow 62 and the arrow 63 that are the virtual objects represented by the guide app (S304). For example, the guide app determines to arrange the arrow 62 and the arrow 63 represented by the guide app in a state indicated by a state T23 illustrated in FIG. 7. After the determination of the arrangement positions performed by the guide app, the arrangement processing unit 117 updates the environmental information 1 to the environmental information 2 that indicates the environment in the real space in the state T23 by adding the arrangement information on the arrow 62 and the arrow 63 represented by the guide app to the environmental information 1 (S306).

<4-2. Arrangement Example of Virtual Object>

Figure 8:
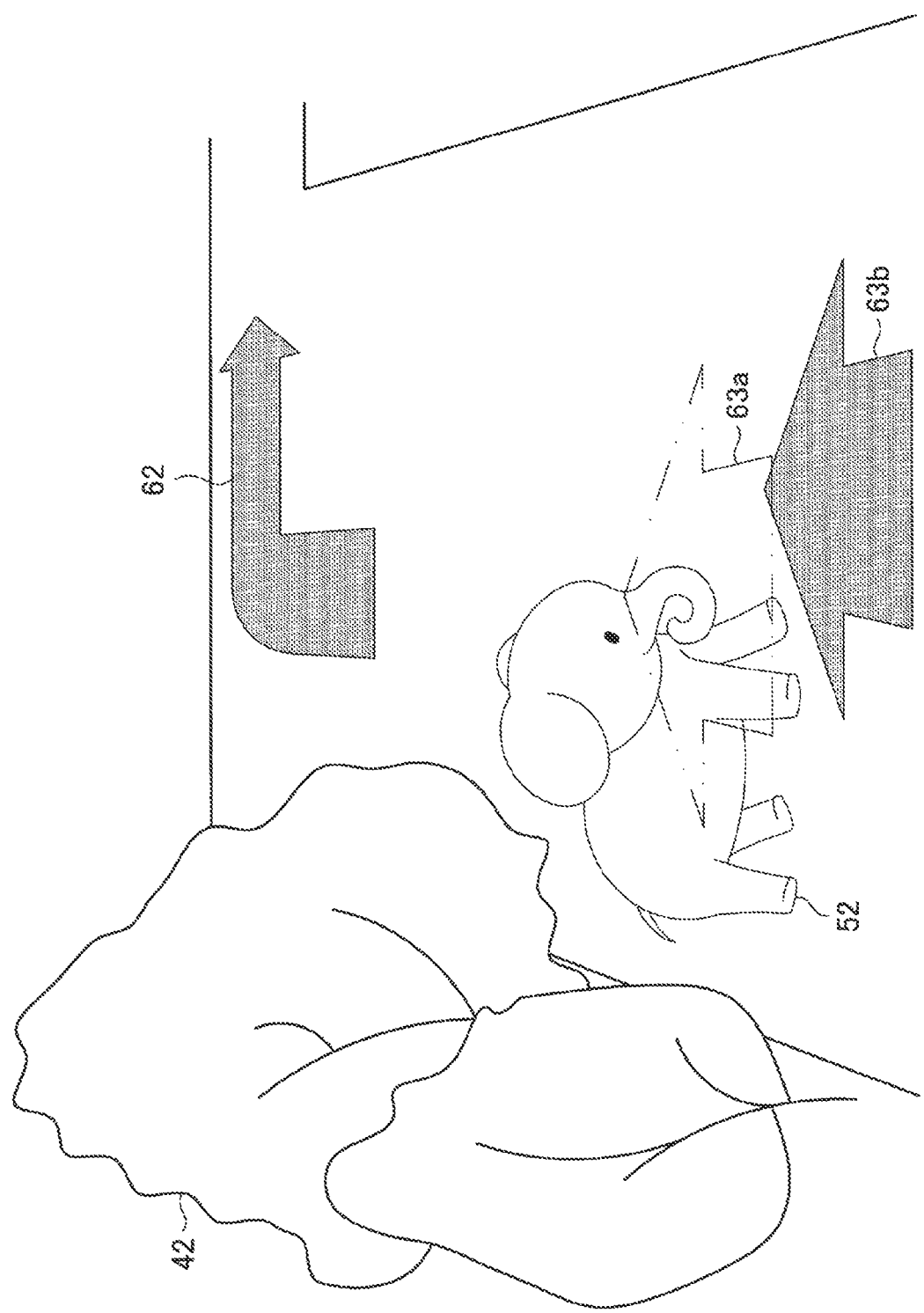
FIG. 8 is a diagram illustrating the arrangement example performed on the virtual object in a specific example according to the embodiment.

In the following, the arrangement example of the virtual object in the specific example according to the embodiment will be described with reference to FIG. 8. FIG. 8 is a diagram illustrating the arrangement example of the virtual object in the specific example according to the embodiment of the present disclosure.

FIG. 8 illustrates, as an example, a display example of, at the time of simultaneously executing the game app and the guide app, the character 52 that is a static virtual object represented by the game app and the arrow 62 and the arrow 63 that are static virtual objects of the guide app. The static virtual object mentioned here is a virtual object that does not move from the initial arrangement position.

In the example illustrated in FIG. 8, the arrangement processing unit 117 shares, at the time of the arrangement process related to the guide app, the environmental information that includes the arrangement position of the character 52 of the game app with the guide app. The guide app refers to the environmental information shared with the arrangement processing unit 117 and determines the positions of the arrow 62 and the arrow 63 at the positions that do not overlap the position of the character 52. After the determination of the arrangement positions of the arrow 62 and the arrow 63 performed by the guide app, the arrangement processing unit 117 adds the arrangement positions of the arrow 62 and the arrow 63 determined by the guide app to the environmental information. Then, the drawing unit 119 displays, based on the updated environmental information, the virtual objects on the display terminal 10 according to the embodiment.

The guide app compares, at the time of determining the arrangement positions of the arrow 62 and the arrow 63, the arrangement position of the character 52 represented by the game app included in the environmental information with the initial arrangement positions of the arrow 62 and the arrow 63. For example, it is assumed that the arrangement position of the character 52 represented by the game app included in the environmental information is the position of the character 52 illustrated in FIG. 8 and it is assumed that the initial arrangement position of the arrow 62 is the position of the arrow 62 illustrated in FIG. 8. The position of the arrow 62 illustrated in FIG. 8 is the position in which the arrow 62 does not overlap the character 52. Thus, the guide app determines to arrange the arrow 62 at the position of the arrow 62 illustrated in FIG. 8 without processing anything.

Furthermore, it is assumed that the initial arrangement position of the arrow 63 is the position of an arrow 63a illustrated in FIG. 8. The position of the arrow 63a illustrated in FIG. 8 is the position in which the arrow 63 overlaps the character 52. Thus, the guide app determines to arrange the arrow 63 at the position in which the arrow 63 and the character 52 do not overlap. For example, the guide app determines to arrange the arrow 63 at the position of an arrow 63b illustrated in FIG. 8.

<4-3. Process Example>

Figure 9:
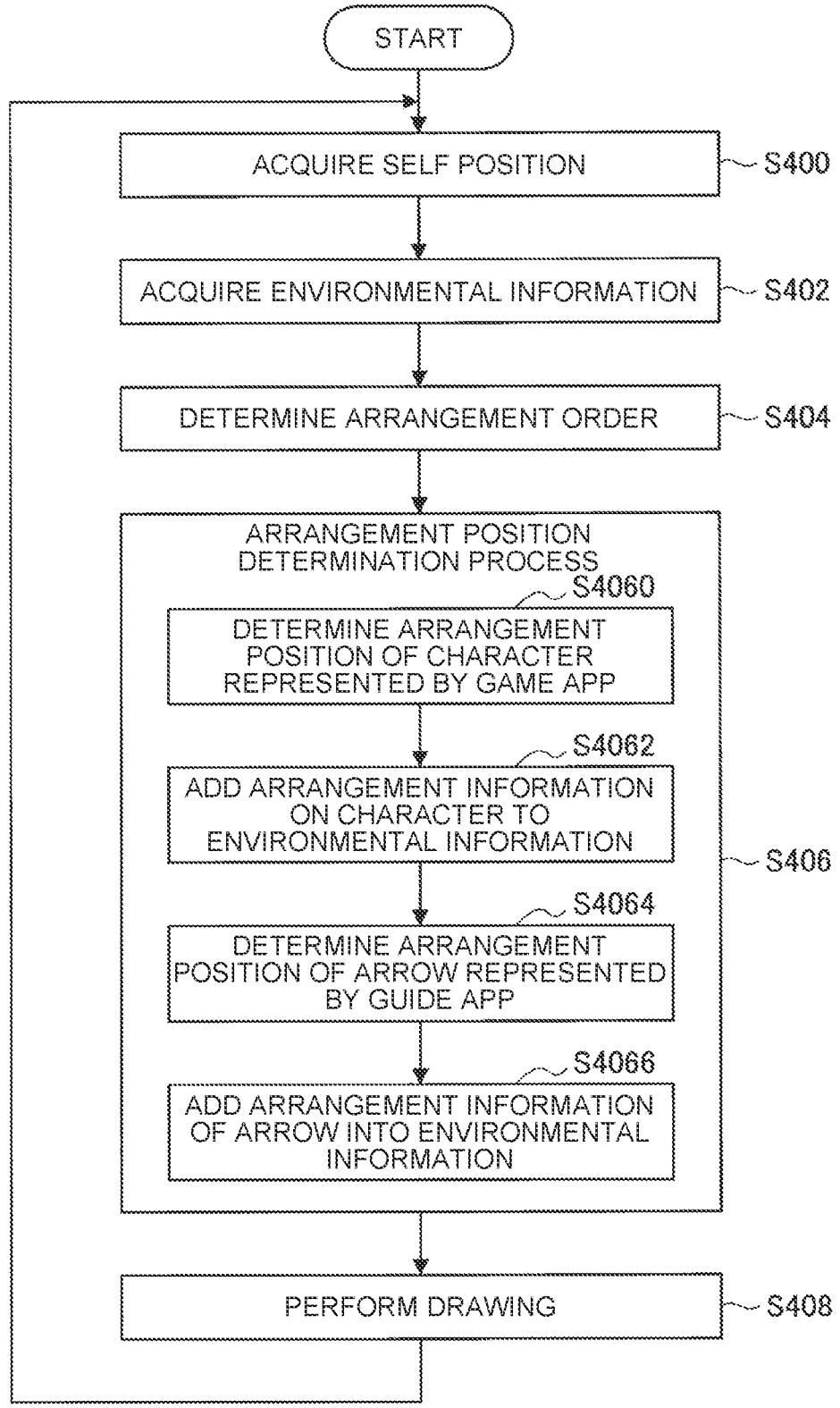
FIG. 9 is a flowchart illustrating the flow of the drawing process in a specific example according to the embodiment.

In the following, the flow of the drawing process in the specific example according to the embodiment will be described with reference to FIG. 9. FIG. 9 is a flowchart illustrating the flow of the drawing process in the specific example according to the embodiment of the present disclosure.

First, the self-position estimating unit 111 estimates the self-position based on the sensing information (S400). Then, the environmental information acquiring unit 113 acquires the environmental information from the cloud server 20 (S402). Then, the arrangement processing unit 117 determines the arrangement order of the virtual objects based on the priority of the plurality of AR apps to be executed (S404). Then, the arrangement processing unit 117 executes the arrangement process on the virtual object and arranges the virtual objects (S406).

In the arrangement process, first, the arrangement processing unit 117 determines the arrangement position of the character of the game app based on the environmental information 0 (S4060). Then, the arrangement processing unit 117 adds the arrangement information on the character to the environmental information 0 and updates the environmental information 0 to the environmental information 1 (S4062). Then, the arrangement processing unit 117 determines the arrangement position of the arrow represented by the guide app based on the environmental information 1 (S4064). Then, the arrangement processing unit 117 adds the arrangement information on the arrow to the environmental information 1, and then, updates the environmental information 1 to the environmental information 2 (S4066).

After the arrangement process, the drawing unit 119 refers to the environmental information 2, generates an image in which the virtual object is drawn at the arrangement position (S408), and displays the generated image on the display unit 140.

5. Modification

In the following, a modification of the embodiment according to the present disclosure will be described. Furthermore, the modification described below may also be independently used in the embodiment according to the present disclosure or may also be used in combination with the embodiment according to the present disclosure. Furthermore, the modification may also be used instead of the configuration described in the embodiment according to the present disclosure or may also be additionally used in the configuration described above in the embodiment according to the present disclosure.

(1) First Modification

In the embodiment described above, a description has been given of an example in which, at the time of updating the environmental information, the arrangement information that indicates the arrangement position of the virtual object is added to the environmental information. If the virtual object is a dynamic virtual object, the arrangement information including moving range information that indicates a moving range of the virtual object may also be added to the environmental information. The dynamic virtual object mentioned here is a virtual object that moves from the arrangement position.

For example, it is assumed that the virtual object represented by the AR app 1 is a dynamic virtual object and is able to move in the three-dimensional space. In this case, after the determination of the arrangement position of the virtual object, the AR app 1 shares the arrangement information including the moving range information that indicates the moving range of the virtual object in the three-dimensional space with the information processing apparatus. The AR app able to reserve the range of the movement of the virtual object by allowing the moving range information to be included into the arrangement information. If the moving range information is included in the shared arrangement information, the arrangement processing unit 117 arranges the virtual object represented by the AR app 2 outside of the moving range of the virtual object represented by the AR app 1 based on the moving range information. With this configuration, the information processing apparatus is able to arrange the virtual object without overlapping each of the virtual objects by taking into account the movements of the dynamic virtual objects. In the following, this configuration will be sequentially described in detail. Furthermore, in a description below, it is assumed that the environmental information 0 acquired by the environmental information acquiring unit 113 is used.

(1-1. Outline of Arrangement Process)

Figure 10:
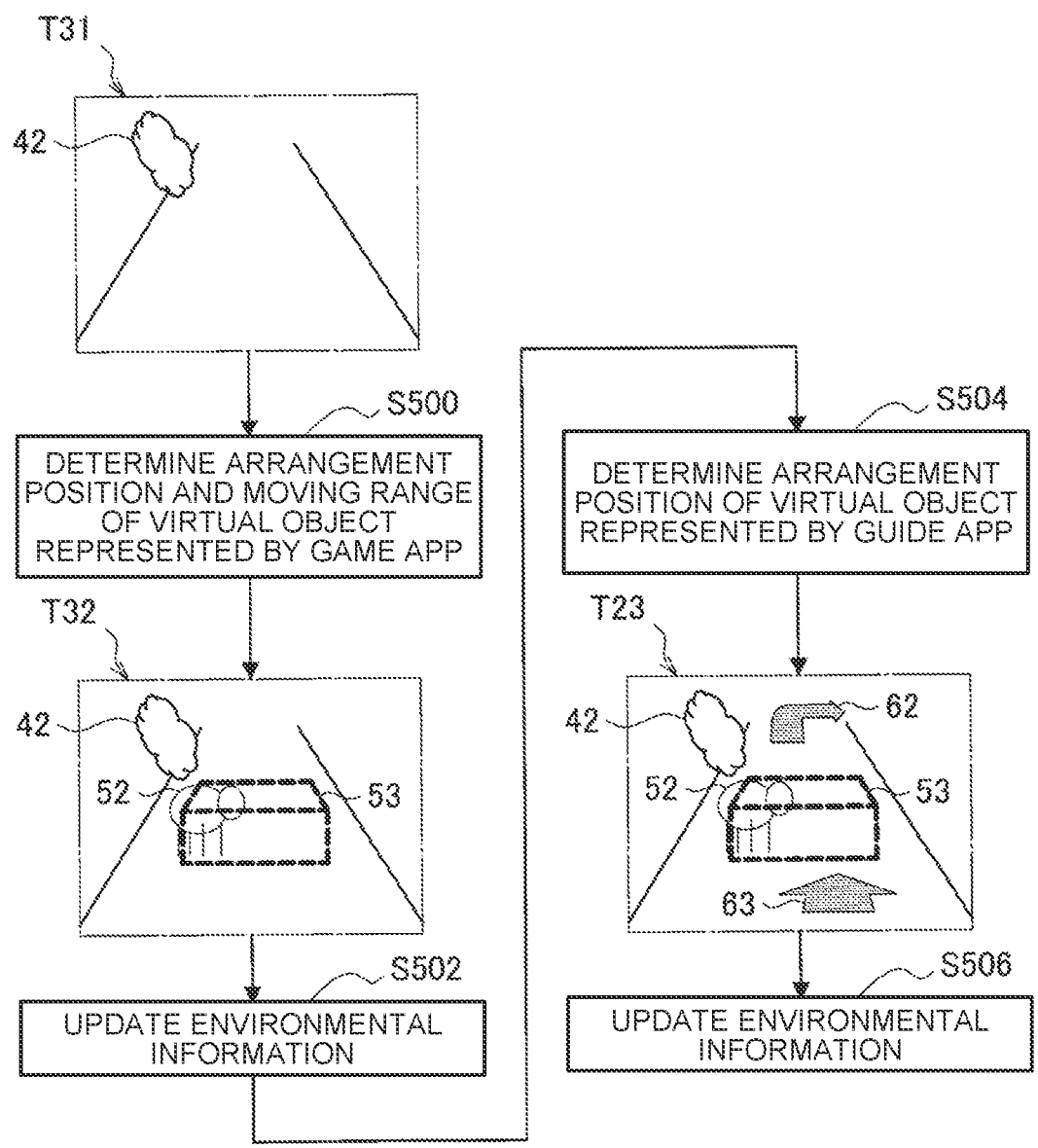
FIG. 10 is a diagram illustrating the outline of the arrangement process performed on the virtual object in a modification according to the embodiment.

First, the outline of the arrangement process performed in the modification according to the embodiment will be described with reference to FIG. 10. FIG. 10 is a diagram illustrating the outline of the arrangement process performed on the virtual object in the modification of the embodiment of the present disclosure.

It is assumed that the environment in the real space before the game app and the guide app are simultaneously executed is a state T31. In the state T31, the tree 42 is present in the real space as a real object. In the state T31, if the game app and the guide app are simultaneously executed, the environmental information acquiring unit 113 acquires the environmental information 0 that indicates the three-dimensional space in the real space in the state T31. After the acquisition of the environmental information 0, the arrangement processing unit 117 shares the acquired environmental information 0 with the game app.

The game app refers to the shared environmental information 0 and determines the arrangement position of the character 52 that is the virtual object represented by the game app (S500). For example, as indicated by the state T32 illustrated in FIG. 10, the game app determines to arrange the character 52 represented by the game app and a moving range 53. After the determination of the arrangement position performed by the game app, the arrangement processing unit 117 adds the character 52 represented by the game app and the arrangement information on the moving range 53 to the environmental information 0, and then, updates the data to the environmental information 1 that indicates the environment in the real space in the state 132 (S502).

Then, the environmental information 1 is shared with the guide app. The guide app refers to the shared environmental information 1 determines the arrangement positions of the arrow 62 and the arrow 63 that are the virtual objects represented by the guide app (S504). For example, as indicated by a state 133 illustrated in FIG. 10, the guide app determines to arrange the arrow 62 and the arrow 63 represented by the guide app. After the determination of the arrangement position performed by the guide app, the arrangement processing unit 117 updates the environmental information 1 to the environmental information 2 that indicates the environment in the real space in the state 133 by adding the arrangement information on the arrow 62 and the arrow 63 represented by the guide app to the environmental information 1 (S506).

Furthermore, the arrangement processing unit 117 may also only include, without arranging the moving range 53 into the environmental information, the moving range information into the environmental information so as to be referred to by the AR app 2. Furthermore, if the moving range 53 is arranged in the environmental information as the virtual object, the arrangement processing unit 117 arranges the moving range 53 as the virtual object that is not drawn.

(1-2. Arrangement Example of Virtual Object)

Figure 11:
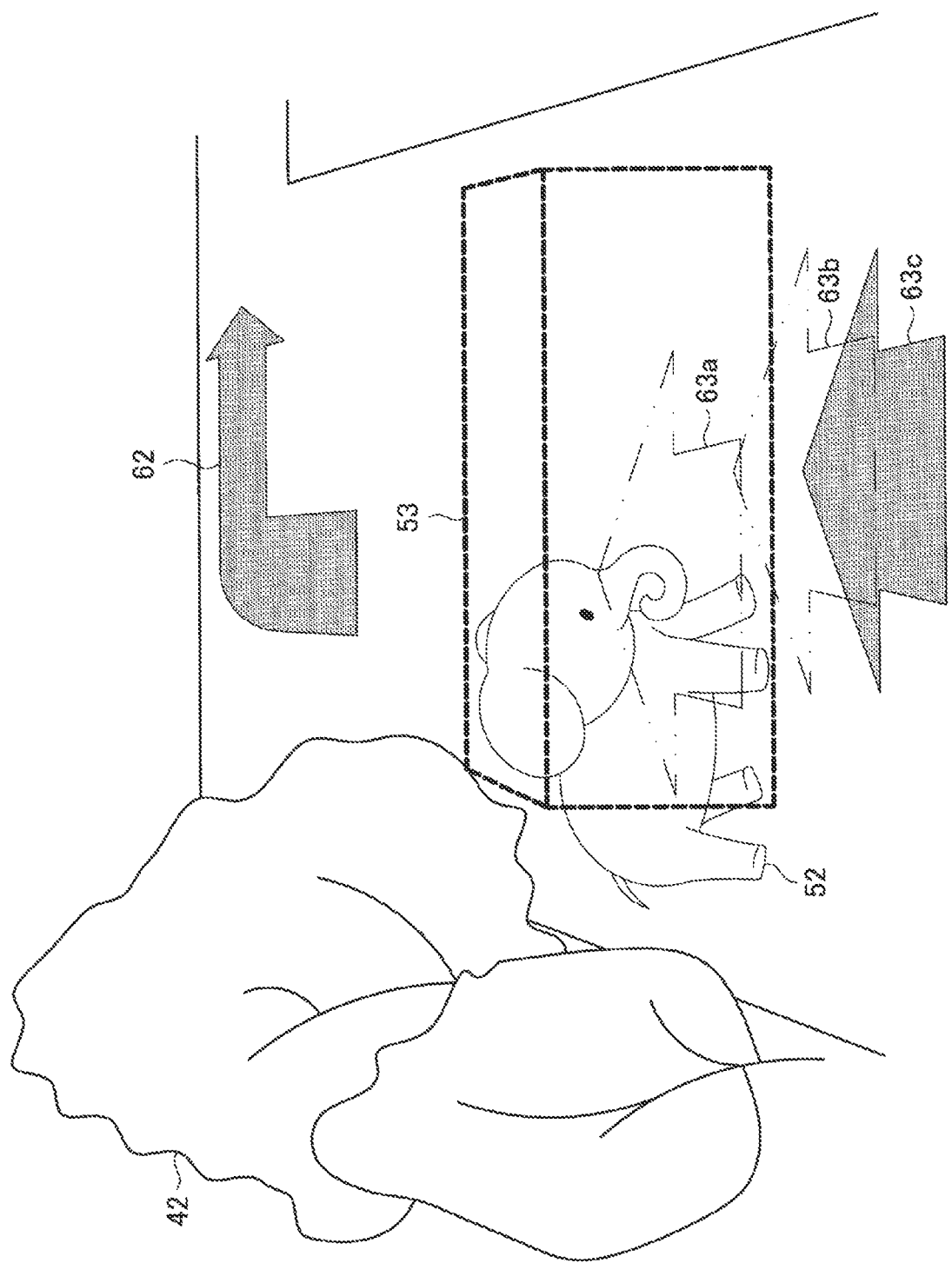
FIG. 11 is a diagram illustrating the arrangement example of the virtual object in a modification according to the embodiment.

In the following, the arrangement example of the virtual object in the modification of the embodiment will be described with reference to FIG. 11. FIG. 11 is a diagram illustrating the arrangement example of the virtual object in the modification of the embodiment according to the present disclosure.

FIG. 11 illustrates, as an example, a display example of, at the time at which the game app and the guide app are simultaneously executed, the character 52 that is the dynamic virtual object represented by the game app and the arrow 62 and the arrow 63 that are the static virtual objects represented by the guide app.

In the example illustrated in FIG. 11, the arrangement processing unit 117 shares, at the time of arrangement process related to the guide app, the environmental information that includes the arrangement position of the character 52 represented by the game app with the guide app. The guide app refers to the environmental information shared by the arrangement processing unit 117 and determines the arrangement position of the arrow 62 and the arrow 63 at the position that does not overlap the character 52 and the moving range 53. After the determination of the arrangement positions of the arrow 62 and the arrow 63 performed by the guide app, the arrangement processing unit 117 adds the arrangement positions of the arrow 62 and the arrow 63 determined by the guide app to the environmental information. Then, the drawing unit 119 displays the virtual object on the display terminal 10 according to the embodiment based on the updated environmental information.

The guide app compares, at the time of determination of the arrangement positions of the arrow 62 and the arrow 63, the arrangement position and the moving range 53 of the character 52 of the game app included in the environmental information with the initial arrangement positions of the arrow 62 and the arrow 63. For example, it is assumed that the arrangement position of the character 52 represented by the game app included in the environmental information is the position of the character 52 illustrated in FIG. 8 and it is assumed that the initial arrangement position of the arrow 62 is the position of the arrow 62 illustrated in FIG. 11. The position of the arrow 62 illustrated in FIG. 11 is the position in which the arrow 62 does not overlap the character 52. Thus, the guide app determines to arrange the arrow 62 at the position of the arrow 62 illustrated in FIG. 11 without processing anything.

Furthermore, it is assumed that the initial arrangement position of the arrow 63 is the position of the arrow 63*a* illustrated in FIG. 11. The position of the arrow 63*a* illustrated in FIG. 11 is the position in which the arrow 63 overlaps the character 52. Thus, the guide app determines to arrange the arrow 63 at the position in which the arrow 63 does not overlap the character 52. For example, the guide app determines to arrange the arrow 63 at the position of the arrow 63*b* illustrated in FIG. 11. However, the position of the arrow 63*b* illustrated in FIG. 11 is the position in which the arrow 63 overlaps the moving range 53 of the character 52. Thus, the guide app determines to arrange the arrow 63 at the position in which the arrow 63 and the moving range 53 do not overlap. For example, the guide app determines to arrange the arrow 63 at the position of an arrow 63*c* illustrated in FIG. 11.

(1-3. Process Example)

Figure 12:
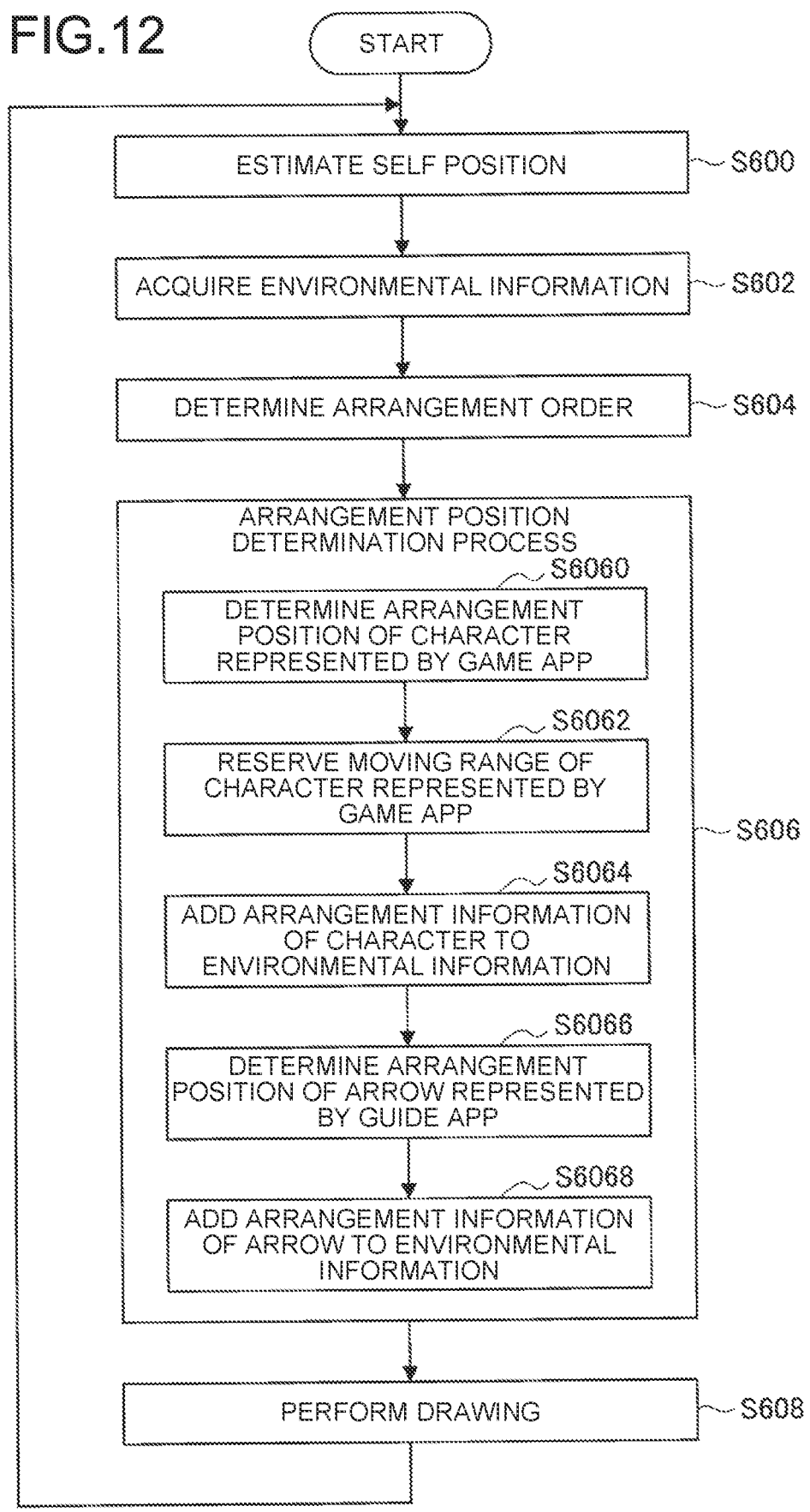
FIG. 12 is a flowchart illustrating the flow of the drawing process performed in a modification according to the embodiment.

In the following, the flow of the drawing process in the modification of the embodiment will be described with reference to FIG. 12. FIG. 12 is a flowchart illustrating the flow of the drawing process in the modification of the embodiment according to the present disclosure.

First, the self-position estimating unit 111 estimates a self-position based on the sensing information (S600). Then, the environmental information acquiring unit 113 acquires the environmental information from the cloud server 20 (S602). Then, the arrangement processing unit 117 determines the arrangement order of the virtual object based on the priority of the plurality of AR apps to be executed (S604). Then, the arrangement processing unit 117 performs the arrangement process on the virtual objects and arranges the virtual objects (S606).

In the arrangement process, first, the arrangement processing unit 117 shares the environmental information 0 with the game app and allows the game app to determine the arrangement position of the character (S6060), and to reserve the moving range of the character (S6062). Then, the arrangement processing unit 117 adds the arrangement information including the arrangement position of the character and the moving range information on the character to the environmental information 0 and updates the environmental information 0 to the environmental information 1 (S6064). Then, the arrangement processing unit 117 shares the environmental information 1 with the guide app and allows the guide app to determine the arrangement position of the arrow (S6066). Then, the arrangement processing unit 117 adds the arrangement information including the arrangement position of the arrow to the environmental information 1 and updates the environmental information 1 to the environmental information 2 (S36066).

After the arrangement process, the drawing unit 119 refers to the environmental information 2, generates an image in which the virtual object is drawn at the arrangement position (S608), and allows the display unit 140 to display the drawn image. With this configuration, because the position of the arrow is constant regardless of the movement of the character, the information processing apparatus is able to enhance the visibility of each of the virtual objects.

(2) Second Modification

In the embodiment described above, an example in which the priority is changed in accordance with the operation performed by the user. If the priority is changed immediately after the operation performed by the user, a behavior of the virtual object represented by the AR app having low priority is affected and this state may possibly provide a feeling of strangeness to the user. For example, if the position of the virtual object represented by the AR app having low priority abruptly moves or the virtual object abruptly disappears, this state may possibly provide a feeling of strangeness to the user.

Therefore, the arrangement processing unit 117 may also change the priority after elapse of a predetermined time since the change in priority is determined. The predetermined time is, for example, a period of time until a series of the AR app is completed, a period of time until the virtual object can be completely viewed on the screen, a period of time until an operation of the dynamic virtual object is completed, or the like. Furthermore, the predetermined time may also be an arbitrary time that is set by the user in advance.

As an example of a change in priority, for example, it is assumed that an operation that indicates to replace the priority of the AR app 1 with the priority of the AR app 2 is input by the user during a movement of the virtual object represented by the AR app 1. At this time, the arrangement processing unit 117 replaces the priority of the AR app 1 with the priority of the AR app 2 after the virtual object represented by the AR app 1 stops moving. Then, the arrangement processing unit 117 performs the arrangement process on the virtual object based on the changed priority.

With this configuration, it is possible to prevent a behavior of the virtual object that is represented by the AR app and in which the changed priority is low from being affected and it is also possible to reduce the feeling of strangeness provided to the user.

Furthermore, the arrangement processing unit 117 may also calculate, independently of the AR app that is not the change target for the priority, the layout of the virtual object represented by the AR app that is a change target for the priority in a period of time after elapse of a predetermined time since the change in priority is determined. Furthermore, the arrangement processing unit 117 may also display the virtual object represented by the AR app targeted for a change in priority by using a wireframe.

With this configuration, the information processing apparatus is able to prevent a display of the virtual object represented by the AR app that is not targeted for a change in priority from being hindered by the virtual object represented by the AR app that is targeted for a change in priority.

6. Example of Hardware Configuration

Figure 13:
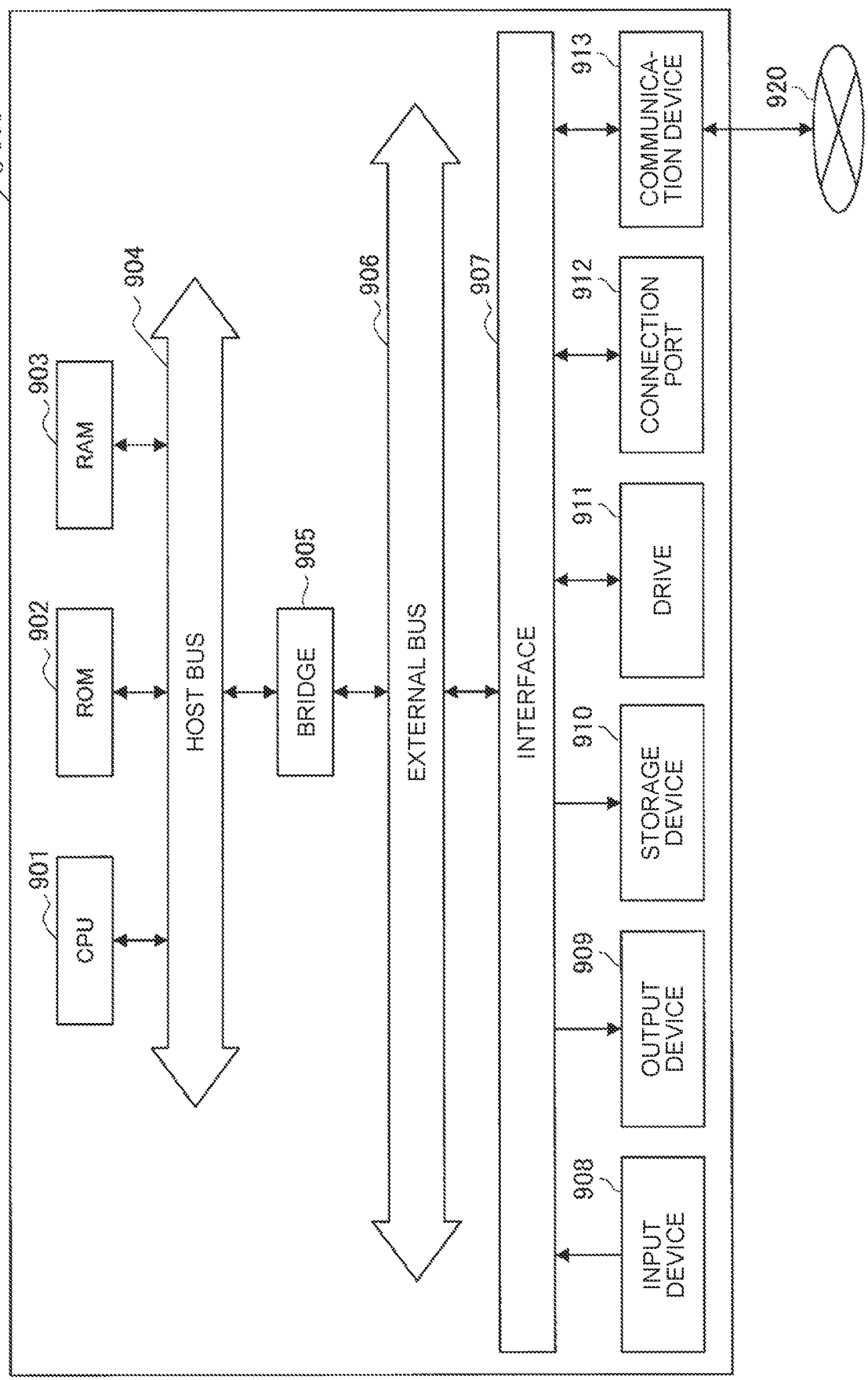
FIG. 13 is a block diagram illustrating the example of a hardware configuration of an information processing apparatus according to an embodiment of the present disclosure.

In the following, an example of a hardware configuration of the information processing apparatus according to the embodiment will be described with reference to FIG. 13. FIG. 13 is a block diagram illustrating an example of the hardware configuration of the information processing apparatus according to the embodiment. Furthermore, an information processing apparatus 900 illustrated in FIG. 13 may implement the display terminal 10 illustrated in, for example, FIG. 3. The information processing performed by the display terminal 10 according to the embodiment is implemented in cooperation with software and hardware that will be described below.

As illustrated in FIG. 13, the information processing apparatus 900 includes a central processing unit (CPU) 901, a read only memory (RON) 902, a random access memory (RAM) 903. Furthermore, the information processing apparatus 900 includes a host bus 904, a bridge 905, an external bus 906, an interface 907, an input device 908, an output device 909, a storage device 910, a drive 911, a connection port 912, and a communication device 913. Furthermore, the hardware configuration illustrated here in the drawing is an example and some component may also be omitted. Furthermore, the hardware configuration may also further include a component other than the components illustrated in the drawing.

The CPU 901 functions as, for example, an arithmetic processing device or a control device and controls the entire or a part of the operation of each of the components based on various programs stored in the ROM 902, the RAM 903, or the storage device 910. The ROM 902 is a mean for storing data or the like that is used for the program read into the CPU 901 or that is used for calculation. The RAM 903 temporarily or permanently stores therein, for example, a program that is read into the CPU 901, a parameter that is appropriately changed at the time of executing the program, or the like. These components are connected with each other by the host bus 904 constituted by a CPU bus or the like. The CPU 901, the ROM 902, and the RAM 903 may implement the function of the control unit 110 described above with reference to FIG. 3 in cooperation with, for example, software.

The CPU 901, the ROM 902, and the RAM 903 are connected with each other via, for example, the host bus 904 that can perform high-speed data transmission. In contrast, the host bus 904 is connected to the external bus 906 having a relatively low-speed data transmission via, for example, the bridge 905. Furthermore, the external bus 906 is connected to various components via the interface 907.

The input device 908 is implemented by, for example, a device, such as a mouse, a keyboard, a touch panel, a button, a microphone, a switch, or a lever, by which information is input by a user. Furthermore, the input device 908 may also be, for example, a remote control device using infrared light or other radio waves, or an externally connected device, such as a mobile phone or a PDA, that is compatible with operation of the information processing apparatus 900. Furthermore, the input device 906 may also include, for example, an input control circuit that generates an input signal based on information that is input by the user using the input means described above and that outputs the generated input signal to the CPU 901. The user of the information processing apparatus 900 is able to input various kinds of data to the information processing apparatus 900 by operating the input device 906.

In addition to this, the input device 908 may be constructed by a device that detects information related to the user. For example, the input device 908 may include various sensors, such as an image sensor (for example, a camera), a depth sensor (for example, a stereo camera), an acceleration sensor, a gyro sensor, a magnetic field sensor, an optical sensor, a sound sensor, a distance measurement sensor (for example, a time of flight (ToF) sensor), or a force sensor. Furthermore, the input device 908 may acquire information on a state of the information processing apparatus 900 itself, such as a posture or a moving speed of the information processing apparatus 900, or information on surrounding environments of the information processing apparatus 900, such as brightness or noise around the information processing apparatus 900. Furthermore, the input device 908 may also include a GNSS module that receives a GNSS signal from a global navigation satellite system (GNSS) satellite (for example, a GPS signal from a global positioning system (GPS) satellite) and that measures position indicated by position information including latitude, longitude, and altitude of the device. Furthermore, regarding the position information, the input device 908 may be a device that sends and receives information to and from a mobile phone, a PHS phone, a smart phone, or the like using Wi-Fi (registered trademark), or that detects a position based on near field communication, or the like. The input device 906 may implement the function of, for example, the sensor unit 100 described above with reference to FIG. 3.

The output device 909 is constructed by a device that is able to visually or aurally notify the user of the acquired information. Examples of this type of device include a display device, such as a CRT display device, a liquid crystal display device, a plasma display device, an EL display device, a laser projector, an LED projector and a lamp; a voice output device, such as a speaker and headphones; and a printer device. The output device 909 outputs, for example, a result that is obtained through various processes performed by the information processing apparatus 900. Specifically, the display device visually displays the result that is obtained through various processes performed by the information processing apparatus 900 in various formats, such as a text, an image, a table, or a graph. In contrast, the voice output device converts an audio signal formed of reproduced voice data, acoustic data, or the like to an analog signal, and then, aurally outputs the analog signal. The output device 909 may implement the function of display unit 140 described above with reference to, for example, FIG. 3.

The storage device 910 is a device for storing therein data that is constructed as an example of the storage unit of the information processing apparatus 900. The storage device 910 is implemented by, for example, a magnetic storage unit device, such as an HDD, a semiconductor storage device, an optical storage device, a magneto optical storage device, or the like. The storage device 910 may also include a storage medium, a recording device for recording data to a storage medium, a reading device for reading data from a storage medium, a deleting device for deleting data recorded in a storage medium, or the like. The storage device 910 stores therein a program and various kinds of data executed by the CPU 901, various kinds of data acquired from outside, and the like. The storage device 910 may implement the function of the storage unit 130 described above with reference to, for example, FIG. 3.

The drive 911 is a reader-writer for a storage medium and is built into or externally attached to the information processing apparatus 900. The drive 911 reads information recorded in an installed magnetic disk, or a removable storage medium, such as an optical disk, a magneto-optical disk, or a semiconductor memory, and outputs the information to the RAM 903. Furthermore, the drive 911 is able to write information to a removable storage medium.

The connection port 912 is, for example, a universal serial bus (USB) port, an IEEE 1394 port, a small computer system interface (SCSI), a RS-232C port, or a port for connecting an externally connected device, such as an optical audio terminal.

The communication device 913 is, for example, a communication interface constructed by a communication device or the like for connecting to a network 920. The communication device 913 is, for example, a wired or wireless local area network (LAN), long term evolution (LTE), Bluetooth (registered trademark), a communication card for a wireless USB (WUSB), or the like. Furthermore, the communication device 913 may also be a router for optical communication, a router for an asymmetric digital subscriber line (ADSL), a modem for various kinds of communication, or the like. The communication device 913 is able to send and receive signals or the like to and from another communication device via, for example, the Internet in accordance with a predetermined protocol, such as TCP/IP. The communication device 913 may implement the function of the communication unit 120 described above with reference to, for example, FIG. 3.

Furthermore, the network 920 is a wired or wireless transmission path for information that is sent from a device connected to the network 920. For example, the network 920 may also include a public line network, such as the Internet, a telephone line network, or a satellite communication network, and may also include various local area networks (LANs), and various wide area networks (WANs) including Ethernet (registered trademark). Furthermore, the network 920 may also include a dedicated line network, such as an Internet Protocol-Virtual Private Network (IP-VPN). The network 920 may implement the function of the network 30 described above with reference to, for example, FIG. 3.

In the above, an example of the hardware configuration capable of implementing the functions of the information processing apparatus 900 according to the embodiment has been described. Each of the components may also be implemented by using a general-purpose member, or may also be implemented by hardware specialized for the functions of each of the components. Therefore, it is possible to appropriately change a hardware configuration to be used in accordance with a technology level at the time the embodiment is carried out.

7. CONCLUSION

As described above, the information processing apparatus according to the embodiment of the present disclosure, first, acquires the environmental information 0 that represents a three-dimensional space in the real world, and then, arranges the virtual object represented by the AR app 1 in the three-dimensional space based on the environmental information 0. Then, the information processing apparatus updates, based on the arrangement of the virtual object represented by the AR app 1, the environmental information 0 to the environmental information 1 that includes the arrangement information on the virtual object represented by the AR app 1. Then, during execution of the AR app 1, the information processing apparatus arranges, based on the environmental information 1, the virtual object represented by the AR app 2 into the three-dimensional space in which the virtual object represented by the AR app 1 is arranged. In other words, the AR app 1 (the AR app 2) recognizes the virtual object represented by the AR app 2 (the virtual object represented by the AR app 1) as the environmental information that is referred to by the AR app 1. With this configuration, the information processing apparatus is able to arrange, by referring to the arrangement information included in the environmental information, each of the virtual objects represented by the AR apps without overlapping each of the virtual objects represented by the AR apps.

Thus, it is possible to provide an information processing apparatus, an information processing method, and a recording medium that are novel, improved, and able to operate a plurality of AR apps in cooperation with each other.

In the above, although the preferred embodiments of the present disclosure have been described in detail above with reference to the accompanying drawings, the technical scope of the present disclosure is not limited to the examples. It is obvious that those having ordinary knowledge in the technical field of the present disclosure can derive modified examples or revised examples within the scope of the technical ideas described in the claims and it is understood that they, of course, belong to the technical scope of the present disclosure.

For example, each of the devices described in this specification may also be implemented as a stand-alone device or some or all of the devices may also be implemented as separate devices. For example, at least one of the sensor unit 100 and the control unit 110 included in the display terminal 10 illustrated in FIG. 3 may also be implemented as a stand-alone device. For example, the sensor unit 100 may also be implemented as a separate device, such as a sensor device, and may also be connected to the display terminal 10 via a network or the like. Furthermore, the control unit 110 may also be implemented as a stand-alone device, such as a server device, and may also be connected to the display terminal 10 via the network.

Furthermore, the series of the processes performed by each of the devices described above in the specification may also be implemented by using software, hardware, or software and hardware in combination. The programs that constitute software is stored, in advance, in a recording medium (non-transitory medium) that is, for example, internally or externally provided in each of the devices. Then, each of the programs is read by a RAM at the time of, for example, execution performed by a computer and is executed by a processor, such as a CPU.

Furthermore, the processes described in this specification by using the flowcharts need not always be processed in the order illustrated in the drawings. Some of the processing steps may also be performed in parallel. Furthermore, an additional processing Step may also be used or some of the processing steps may also be omitted.

Furthermore, the effects described in this specification are only explanatory or exemplary and thus are not definitive. In other words, the technique according to the present disclosure may achieve, together with the effects described above or instead of the effects described above, other effects obvious to those skilled in the art from the description of this specification.

Furthermore, the following configurations are also within the technical scope of the present disclosure.

(1)

An information processing apparatus comprising:
a control unit that
acquires first environmental information that expresses a three-dimensional space in the real world,
arranges, based on the first environmental information, a first virtual object represented by a first application into the three-dimensional space,
updates, based on the arrangement of the first virtual object, the first environmental information to second environmental information that includes information that indicates the arrangement of the first virtual object, and
arranges, during execution of the first application, based on the second environmental information, a second virtual object represented by a second application into the three-dimensional space in which the first virtual object is arranged.

(2)

The information processing apparatus according to (1), wherein the control unit arranges the first virtual object and the second virtual object based on priority of the arrangement of each of the first virtual object and the second virtual object.

(3)

The information processing apparatus according to (2), wherein the priority of the first virtual object is higher than the priority of the second virtual object.

(4)

The information processing apparatus according to (2) or (3), wherein, when the control unit arranges the second virtual object, the control unit arranges, based on the second environmental information, the second virtual object according to whether or not the first virtual object is arranged at an initial arrangement position of the second virtual object.

(5)

The information processing apparatus according to (4), wherein, when the first virtual object is arranged at the initial arrangement position of the second virtual object and when the priority of the first virtual object is higher than the priority of the second virtual object, the control unit arranges the second virtual object at a position other than the initial arrangement position.

(6)

The information processing apparatus according to any one of (2) to (5), wherein
the priority includes first priority that is priority set to applications, and the control unit compares the first priority set for each of the applications and arranges, with priority, a virtual object represented by the application in which the first priority is high.

(7) The information processing apparatus according to any one of (2) to (6), wherein
the priority includes second priority that is priority set to virtual objects without distinction between applications, and
the control unit compares the second priority set for each of the virtual objects and arranges, with priority, the virtual object in which the second priority is high.

(8) The information processing apparatus according to any one of (2) to (7), wherein, based on a designation method of designating coordinates that indicate an arrangement position of a virtual object that is set by an application, the control unit sets the priority of the virtual object.

(9) The information processing apparatus according to (8), wherein the control unit sets the priority of the virtual object of which the designation method of the coordinates being absolute coordinates to be higher than the priority of the virtual object of which the designation method of the coordinates being relative coordinates.

(10) The information processing apparatus according to any one of (2) to (9), wherein, based on a degree of freedom of a movement of a virtual object, the control unit sets the priority of the virtual object.

(11) The information processing apparatus according to (10), wherein the control unit sets the priority of the virtual object, in which the degree of freedom of the movement is low, to be higher than the priority of the virtual object in which the degree of freedom of the movement is high.

(12) The information processing apparatus according to any one of (2) to (11), wherein, when the first virtual object moves in the three-dimensional space, the second environmental information includes moving range information that indicates a moving range of the first virtual object in the three-dimensional space.

(13) The information processing apparatus according to (12), wherein the control unit arranges, based on the moving range information, the second virtual object outside of the moving range of the first virtual object.

(14) The information processing apparatus according to any one of (2) to (13), wherein the control unit changes the priority in accordance with an input to the information processing apparatus performed by a user.

(15) The information processing apparatus according to (14), wherein the control unit changes the priority after elapse of a predetermined time since the priority is determined to be changed.

(16) The information processing apparatus according to any one of (1) to (15), wherein the second environmental information includes information that indicates the shape of the first virtual object arranged in the three-dimensional space and coordinate information that indicates the arranged position of the first virtual object.

(17) The information processing apparatus according to any one of (1) to (16), wherein the first environmental information and the second environmental information include information that indicates a shape in the three-dimensional space.

(18) The information processing apparatus according to any one of (1) to (17), further comprising a sensor unit, wherein
the control unit estimates the first environmental information based on sensing information that is obtained by sensing around the information processing apparatus by the sensor unit.

(19) The information processing apparatus according to any one of (1) to (17), wherein
the first application is programmed such that the arrangement of the first virtual object is able to be changed but the arrangement of the second virtual object is not able to be changed,
the second application is programmed such that the arrangement of the second virtual object is able to be changed but the arrangement of the first virtual object is not able to be changed, and
a data format of the first environmental information and a data format of the second environmental information are the same.

(20) An information processing method implemented by a processor to execute a process comprising:
acquiring first environmental information that expresses a three-dimensional space in the real world;
arranging, based on the first environmental information, a first virtual object represented by a first application into the three-dimensional space;
updating, based on the arrangement of the first virtual object, the first environmental information to second environmental information that includes information that indicates the arrangement of the first virtual object; and
arranging, during execution of the first application, based on the second environmental information, a second virtual object represented by a second application into the three-dimensional space in which the first virtual object is arranged.

(21) A recording medium having stored therein a program that causes a computer to function as:
a control unit that
acquires first environmental information that expresses a three-dimensional space in the real world;
arranges, based on the first environmental information, a first virtual object represented by a first application into the three-dimensional space;
updates, based on the arrangement of the first virtual object, the first environmental information to second environmental information that includes information that indicates the arrangement of the first virtual object; and
arranges, during execution of the first application, based on the second environmental information, a second virtual object represented by a second application into the three-dimensional space in which the first virtual object is arranged.

REFERENCE SIGNS LIST

10 display terminal
20 cloud server 30 network
100 sensor unit
101 outward camera
103 acceleration sensor
105 gyro sensor
107 orientation sensor
109 GPS sensor
110 control unit
111 self-position estimating unit
113 environmental information acquiring unit
115 environmental information estimating unit
117 arrangement processing unit
119 drawing unit
120 communication unit
130 storage unit
140 display unit
1000 information processing system

The invention claimed is:

1. An information processing apparatus comprising: circuitry configured to acquire first environmental information that expresses a three-dimensional space in a real world,
arrange, based on the first environmental information, a first virtual object represented by a first application into the three-dimensional space,
update, based on an arrangement of the first virtual object, the first environmental information to second environmental information that includes information that indicates the arrangement of the first virtual object, and
arrange, during execution of the first application, based on the second environmental information, a second virtual object represented by a second application into the three-dimensional space in which the first virtual object is arranged,
wherein the circuitry arranges the first virtual object based on moving range information that indicates a moving range of the first virtual object within which the first virtual object moves in the three-dimensional space from an initial arrangement position of the first virtual object,
wherein the information that indicates the arrangement of the first virtual object includes the moving range information, and
wherein the circuitry arranges the second virtual object without overlapping the arrangement of the first virtual object based on the moving range of the first virtual object included in the information that indicates the arrangement of the first virtual object included in the second environmental information.

2. The information processing apparatus according to claim 1,
wherein the circuitry arranges the first virtual object and the second virtual object based on a priority of arrangement of the first virtual object and a priority of arrangement of the second virtual object.

3. The information processing apparatus according to claim 2,
wherein the priority of arrangement of the first virtual object is higher than the priority of arrangement of the second virtual object.

4. The information processing apparatus according to claim 2,
wherein, when the circuitry arranges the second virtual object, the circuitry arranges, based on the second environmental information, the second virtual object according to whether or not the first virtual object is arranged at an initial arrangement position of the second virtual object.

5. The information processing apparatus according to claim 4,
wherein, when the first virtual object is arranged at the initial arrangement position of the second virtual object and when the priority of arrangement of the first virtual object is higher than the priority of arrangement of the second virtual object, the circuitry arranges the second virtual object at a position other than the initial arrangement position.

6. The information processing apparatus according to claim 2,
wherein the priority includes a first priority that is set for each application of a plurality of applications, and
wherein the circuitry is further configured to
compare the first priority set for each application, and
arrange, with priority, a virtual object represented by an application for which the first priority is set higher than the first priority set for other applications of the plurality of applications.

7. The information processing apparatus according to claim 2,
wherein the priority includes a second priority that is set for each virtual object of a plurality of virtual objects without distinction between applications, and
wherein the circuitry is further configured to
compare the second priority set for each virtual object, and
arrange, with priority, a virtual object for which the second priority is set higher than the second priority set for other virtual objects of the plurality of virtual objects.

8. The information processing apparatus according to claim 2,
wherein, based on a designation method of designating coordinates that indicate an arrangement position of a virtual object that is set by an application, the circuitry sets a priority of the virtual object.

9. The information processing apparatus according to claim 8,
wherein the circuitry sets the priority of the virtual object for which a designation method designates absolute coordinates to be higher than the priority of the virtual object for which a designation method designates relative coordinates.

10. The information processing apparatus according to claim 2,
wherein, based on a degree of freedom of a movement of a virtual object, the circuitry sets a priority of the virtual object.

11. The information processing apparatus according to claim 10,
wherein the circuitry sets the priority of the virtual object, in which the degree of freedom of the movement is less than a predetermined threshold, to be higher than the priority of the virtual object in which the degree of freedom of the movement is greater than the predetermined threshold.

12. The information processing apparatus according to claim 2,
wherein the second environmental information includes the moving range information that indicates the moving range of the first virtual object in the three-dimensional space.

13. The information processing apparatus according to claim 12,
wherein the circuitry arranges, based on the moving range information, the second virtual object outside of the moving range of the first virtual object.

14. The information processing apparatus according to claim 2,
wherein the circuitry changes the priority in accordance with an input to the information processing apparatus performed by a user.

15. The information processing apparatus according to claim 14,
wherein the circuitry changes the priority after elapse of a predetermined time since the priority is determined to be changed.

16. The information processing apparatus according to claim 1,
wherein the second environmental information includes information that indicates a shape of the first virtual object arranged in the three-dimensional space and coordinate information that indicates a position of the arrangement of the first virtual object.

17. The information processing apparatus according to claim 1,
wherein the first environmental information and the second environmental information each include information indicating a shape in the three-dimensional space.

18. The information processing apparatus according to claim 1, further comprising:
a sensor unit,
wherein the circuitry estimates the first environmental information based on sensing information that is obtained by sensing around the information processing apparatus by the sensor unit.

19. The information processing apparatus according to claim 1,
wherein the first application is programmed such that the arrangement of the first virtual object is able to be changed but an arrangement of the second virtual object is not able to be changed,
wherein the second application is programmed such that the arrangement of the second virtual object is able to be changed but the arrangement of the first virtual object is not able to be changed, and
wherein a data format of the first environmental information and a data format of the second environmental information are the same.

20. The information processing apparatus according to claim 1,
wherein the second environmental information includes coordinate information that indicates a position of the initial arrangement position of the first virtual object and a position of the indicated moving range of the first virtual object in the three-dimensional space.

21. An information processing method implemented by a processor to execute a process comprising:
acquiring first environmental information that expresses a three-dimensional space in a real world;
arranging, based on the first environmental information, a first virtual object represented by a first application into the three-dimensional space;
updating, based on an arrangement of the first virtual object, the first environmental information to second environmental information that includes information that indicates the arrangement of the first virtual object; and
arranging, during execution of the first application, based on the second environmental information, a second virtual object represented by a second application into the three-dimensional space in which the first virtual object is arranged,
wherein the first virtual object is arranged based on moving range information that indicates a moving range of the first virtual object within which the first virtual object moves in the three-dimensional space from an initial arrangement position of the first virtual object,
wherein the information that indicates the arrangement of the first virtual object includes the moving range information, and
wherein the second virtual object is arranged without overlapping the arrangement of the first virtual object based on the moving range of the first virtual object included in the information that indicates the arrangement of the first virtual object included in the second environmental information.

22. A non-transitory computer-readable storage medium having embodied thereon a program, which when executed by a computer causes the computer to execute a method, the method comprising:
acquiring first environmental information that expresses a three-dimensional space in a real world;
arranging, based on the first environmental information, a first virtual object represented by a first application into the three-dimensional space;
updating, based on an arrangement of the first virtual object, the first environmental information to second environmental information that includes information that indicates the arrangement of the first virtual object; and
arranging, during execution of the first application, based on the second environmental information, a second virtual object represented by a second application into the three-dimensional space in which the first virtual object is arranged,
wherein the first virtual object is arranged based on moving range information that indicates a moving range of the first virtual object within which the first virtual object moves in the three-dimensional space from an initial arrangement position of the first virtual object,
wherein the information that indicates the arrangement of the first virtual object includes the moving range information, and
wherein the second virtual object is arranged without overlapping the arrangement of the first virtual object based on the moving range of the first virtual object included in the information that indicates the arrangement of the first virtual object included in the second environmental information.

\* \* \* \* \*